(12) United States Patent
Koo et al.

(10) Patent No.: US 9,693,308 B2
(45) Date of Patent: Jun. 27, 2017

(54) METHOD AND MOBILE COMMUNICATION TERMINAL FOR ESTIMATING BATTERY CONSUMPTION STATE

(71) Applicants: Samsung Electronics Co., Ltd., Suwon-si (KR); Seoul National University R&DB Foundation, Seoul (KR)

(72) Inventors: Jong-Hoe Koo, Seoul (KR); Sunghyun Choi, Seoul (KR); Won-Bo Lee, Suwon-si (KR); Yong-Seok Park, Seoul (KR); Ok-Seon Lee, Suwon-si (KR); Young-Ki Hong, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/858,963

(22) Filed: Sep. 18, 2015

(65) Prior Publication Data

US 2016/0088563 A1 Mar. 24, 2016

(30) Foreign Application Priority Data

Sep. 18, 2014 (KR) .................. 10-2014-0124521
Jul. 30, 2015 (KR) .................. 10-2015-0108341

(51) Int. Cl.
*G08B 21/00* (2006.01)
*H04W 52/02* (2009.01)

(52) U.S. Cl.
CPC ... *H04W 52/0251* (2013.01); *H04W 52/0254* (2013.01); *H04W 52/0267* (2013.01); *Y02B 60/50* (2013.01)

(58) Field of Classification Search
CPC .......... H04W 52/0251; H04W 52/0254; G01R 31/3679
USPC ...................................... 340/636.19
See application file for complete search history.

(56) References Cited

U.S. PATENT DOCUMENTS

| | | | | |
|---|---|---|---|---|
| 5,692,204 A * | 11/1997 | Rawson | ............... | G06F 1/3287 713/310 |
| 2004/0117137 A1* | 6/2004 | Jin | ............... | G01R 31/3624 702/63 |
| 2010/0216521 A1* | 8/2010 | Wu | ............... | H04W 52/0258 455/572 |
| 2012/0317408 A1* | 12/2012 | Happonen | ............... | H04W 52/0251 713/100 |
| 2014/0343628 A1* | 11/2014 | Kaula | ............... | A61N 1/37247 607/59 |

(Continued)

FOREIGN PATENT DOCUMENTS

KR 10-2005-0065553 6/2005
KR 10-2013-0081592 7/2013

*Primary Examiner* — Mark Rushing
(74) *Attorney, Agent, or Firm* — McAndrews, Held & Malloy, Ltd.

(57) ABSTRACT

A method for estimating a battery consumption state of a mobile communication terminal is provided. The method includes building a database with battery characteristic information changing according to at least one of a temperature and an aging characteristic of a battery supplying power to the mobile communication terminal, and estimating a power consumption of the mobile communication terminal and a battery drain rate based on the battery characteristic information and displaying estimated information.

16 Claims, 28 Drawing Sheets

(56) References Cited

U.S. PATENT DOCUMENTS

2015/0268713 A1* 9/2015 Jain ..................... G06F 1/3212
                                                                         713/320

* cited by examiner

STATUS BAR USED

|  | Experiment #1 | Experiment #2 | Experiment #3 | Avg. | Std. |
|---|---|---|---|---|---|
| Avg.power(W) | 1.475 | 1.573 | 1.512 | 1.520 | 0.040 |
| WMA(W) (a=0.7) | 1.39 | 1.05 | 1.165 | 1.201 | 0.141 |
|  | Measurement #1 | Measurement #2 | Measurement #3 | Avg. | Std. |
| Measured power (W) | 1.348 | 1.445 | 1.454 | 1.415 | 0.047 |

FIG.7B

|  | Experiment #1 | Experiment #2 | Experiment #3 | Avg. | Std. |
|---|---|---|---|---|---|
| Avg.power(W) | 1.633 | 1.546 | 2.332 | 1.837 | 0.351 |
| WMA(W) (a=0.7) | 1.534 | 1.459 | 1.858 | 1.617 | 0.173 |
|  | Measurement #1 | Measurement #2 | Measurement #3 | Avg. | Std. |
| Measured power (W) | 1.864 | 2.213 | 1.807 | 1.961 | 0.179 |

FIG.7D

| Algorithm 1 $V_{oc}$ estimation algorithm |
| --- |
| Initialize : |
| 1:   if Device is in idle then |
| 2:         $V_{oc} = V_{out}$ |
| 3:   else |
| 4:         $V_{oc} \leftarrow f(S)$ |
| 5:   end if |
| During run time : |
| 6:   while BattTracker is running do |
| 7:     if SoC changes to n (n $\in$ 1,2,3, ..., 99) then |
| 8:         $S \leftarrow n, V_{oc} \leftarrow f(n)$       ▷ $V_{oc}$ recalibrator |
| 9:     else |
| 10:       if $V_{out} \geq V_{oc}$ then |
| 11:         $V_{oc} = V_{out}$                 ▷ $V_{oc}$ recalibrator |
| 12:       else |
| 13:         Get estimated R from battery status estimator |
| 14:         $V_{oc} \leftarrow$ Update $V_{oc}(V_{oc}, S, R_d, t_s)$   ▷ $V_{oc}$ tracker |
| 15:       end if |
| 16:     end if |
| 17:   end while |

FIG.10

Algorithm 2 Battery parameter estimation algorithm

Initialize :
1:  $A \leftarrow 0, S' \leftarrow SoC$

Waiting for SoC decrease by 1%
2:  while $S' = SoC$ do
    /*Wait for next sample time*/
3:  end while
4:  $S' \leftarrow SoC$ Estimate r whenever SoC decreases by 1%
5:  while BattTracker runs do
6:      while $S' = SoC$ do
7:          Get SoC, $V_{out}$, and $V_{oc}$
8:          $A \leftarrow A + (V_{oc} - V_{out}) \cdot t_s$
9:      end while
10:     $r \leftarrow \dfrac{100 \cdot A}{C_f} - \dfrac{1}{3600}$ , $A \leftarrow 0, S' \leftarrow SoC$
11: end while

FIG.11

METHOD AND MOBILE COMMUNICATION TERMINAL FOR ESTIMATING BATTERY CONSUMPTION STATE

CROSS-REFERENCE TO RELATED APPLICATION(S)

This application claims the benefit under 35 U.S.C. §119(a) of a Korean patent application filed in the Korean Intellectual Property Office on Sep. 18, 2014, and assigned Serial No. 10-2014-0124521 and a Korean patent application filed in the Korean Intellectual Property Office on Jul. 30, 2015, and assigned Serial No. 10-2015-0108341, the entire disclosure of both of which is incorporated herein by reference.

BACKGROUND

The present disclosure relates to a method and mobile communication terminal for estimating a battery consumption state.

In general, the capacity of a battery that supplies power to a mobile communication terminal is estimated in order to prevent full discharge of the battery, and thus, prevent damage to the battery or to enable use of the mobile communication terminal in an emergency situation.

Along with the rapid development of mobile communication, mobile communication terminals have been developed to provide data communication functions such as schedule management, fax transmission and reception, and Internet connection and various usages of a large-capacity memory, a camera, a video player, an audio player, and the like, in addition to the traditional wireless communication during roaming. Further, a user can install applications in a mobile terminal and use on-line games and video and audio services through the applications. As a consequence, the battery of the mobile terminal has different power consumption depending on a usage or operation used by the user. Moreover, a small battery is used for a mobile communication terminal in consideration of portability and design. To continuously use the mobile communication terminal, it is necessary to periodically replace and charge the battery. Thus, if the battery is replaced and charged a reduced number of times in the mobile communication terminal, the user feels improved performance of the mobile communication terminal. In this context, various low-power terminal operation techniques have been studied. To implement a technique for determining current power consumption of a terminal, and thus, adaptively operating the terminal among the low-power terminal operation techniques, it is essential to estimate the power consumption of the terminal.

Accordingly, approaches for estimating the power consumption of a battery more accurately are lacking, and more specifically, lacking in a mobile communication terminal where lengthening the lifetime of the mobile communication terminal is sought.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide a method and mobile communication terminal for estimating a battery consumption state.

In accordance with an aspect of the present disclosure, there is provided a method for estimating a battery consumption state of a mobile communication terminal. The method includes building a database with battery characteristic information changing according to at least one of a temperature and an aging characteristic of a battery supplying power to the mobile communication terminal, and estimating a power consumption of the mobile communication terminal and a battery drain rate based on the battery characteristic information and displaying estimated information.

In accordance with another aspect of the present disclosure, there is provided a mobile communication terminal for estimating a battery consumption state. The mobile communication terminal includes a training module for building a database with battery characteristic information changing according to at least one of a temperature and an aging characteristic of a battery supplying power to the mobile communication terminal, and a controller for estimating a power consumption of the mobile communication terminal and a battery drain rate based on the battery characteristic information and controlling display of estimated information on a display screen.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 7B is an exemplary table comparing estimates and measurements of battery consumption state information, when video data is received in a mobile communication terminal according to an embodiment of the present disclosure;

FIG. 7D is an exemplary table comparing estimates and measurements of battery consumption state information, when Web surfing is performed in a mobile communication terminal according to an embodiment of the present disclosure;

FIG. 10 illustrates an operation algorithm of a No-Load Voltage (NLV) estimator according to an embodiment of the present disclosure;

FIG. 11 illustrates an operation algorithm of a battery parameter estimator according to an embodiment of the present disclosure;

Throughout the drawings, like reference numerals will be understood to refer to like parts, components, and structures.

DETAILED DESCRIPTION

Figure 1A:
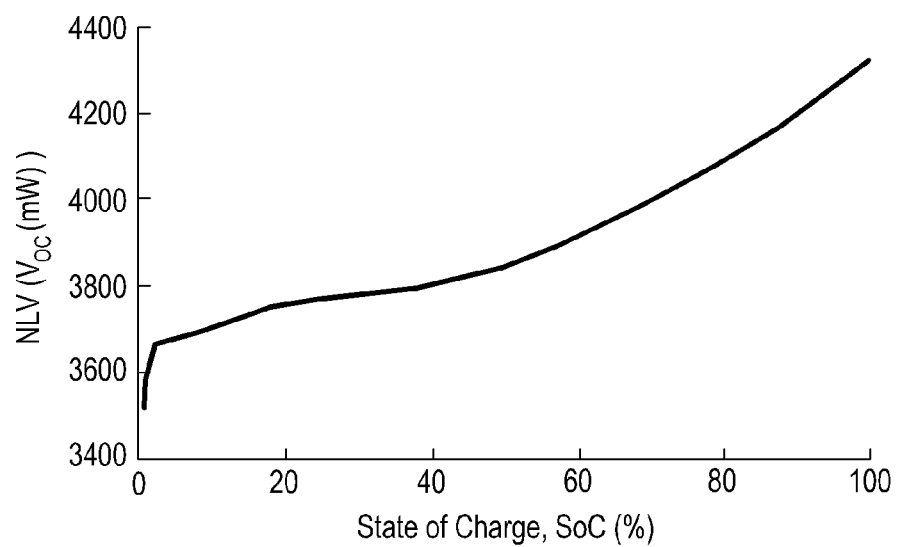
FIG. 1A is a graph illustrating open-circuit voltages versus State of Charges (SoCs) in a Li-ion battery.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of embodiments described herein can be made without departing from the scope and spirit of the disclosure. In addition, descriptions of well-known functions and constructions may be omitted for clarity and conciseness.

The terms and words used in the following description and claims are not limited to dictionary meanings, but, are merely used by the inventor to enable a clear and consistent understanding of the disclosure. Accordingly, it should be apparent to those skilled in the art that the following description of exemplary embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially," it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In general, the power of a mobile communication terminal is acquired by measuring current flowing through the mobile communication terminal using an external measuring device. If the mobile communication terminal operates on Android, it has an Application Program Interface (API) that provides battery information and thus may acquire the battery information at an application end. However, the battery information provided by the API is no more than information about the temperature, status, voltage, and type of a battery. Therefore, a typical mobile communication terminal has difficulty in measuring power consumption because it cannot acquire information about current flowing through the mobile communication terminal from battery information.

Accordingly, techniques for estimating power consumption, without using an external measuring device, in a mobile communication terminal have been studied. One of the techniques is to use a chip that measures the State of Charge (SoC) of a mobile communication terminal. An SoC estimated by use of the chip is defined as the ratio of a remaining capacity to a maximum battery capacity, expressed as an integer ranging from 0 to 100 in percentage. Thus, in these circumstances, a user cannot estimate a battery drain rate until the current battery capacity is dropped by 1%. As a consequence, the update period of power consumption is lengthened to a few minutes. Moreover, if the power consumption of the battery is low, the update period of the power consumption estimated in this manner is further lengthened.

Another of the techniques is based on the idea that, as the SoC of a Lithium ion battery (Li-ion battery) generally used in a smartphone is decreased, the open-circuit voltage $V_{oc}$ of the Li-ion battery is dropped, as illustrated in the graph of FIG. 1A.

Because the mobile communication terminal cannot directly measure the open-circuit battery voltage $V_{oc}$, the mobile communication terminal may measure its load voltage and approximate the measured load voltage to the open-circuit battery voltage $V_{oc}$. Substantially, the load voltage is a voltage decreased from the open-circuit battery voltage $V_{oc}$ by a voltage decrement in an internal resistor. Accordingly, as current flowing through the mobile communication terminal increases, the voltage decrement also increases in the internal resistor of the battery. Thus, a measurement of the load voltage of the mobile communication terminal gets much lower than the open-circuit voltage of the mobile communication terminal. If the current of the mobile communication terminal changes substantially, it is difficult to accurately estimate the open-circuit battery voltage $V_{oc}$, which increases the probability of wrong SoC estimation.

Accordingly, an embodiment of the present disclosure provides a method and configuration for estimating current flowing through a mobile communication terminal from a change in a measurable load voltage applied to the mobile communication terminal and estimating the power consumption of the mobile communication terminal using the estimated current. An embodiment of the present disclosure will be described below in the context of a mobile communication terminal equipped with a Li-ion battery, which has a built-in battery interface that provides battery information, such as information about the temperature, load voltage, and SoC of the battery, and the like, by way of example.

According to embodiments of the present disclosure, to more accurately measure the power consumption of a mobile communication terminal, changes in battery internal resistance and total battery capacity according to temperatures of the mobile communication terminal are measured and the power consumption of the battery is estimated based on the measurements.

Figure 1B:
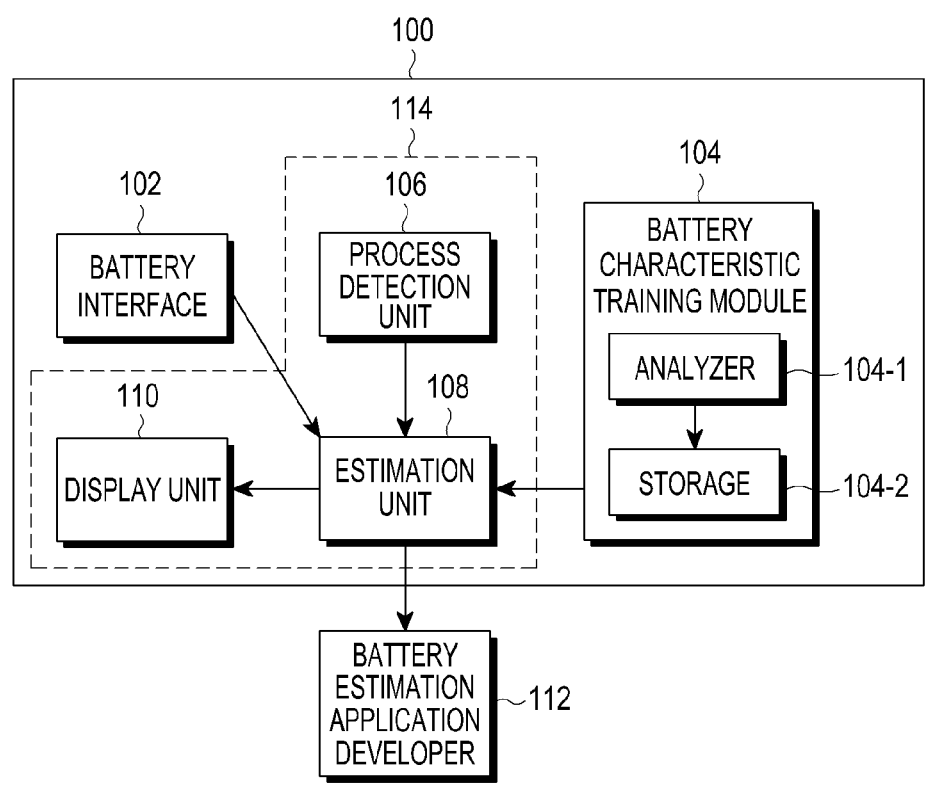
FIG. 1B is an exemplary block diagram of an apparatus for estimating the power consumption, battery drain rate, and battery lifetime of a mobile communication terminal according to an embodiment of the present disclosure.

FIG. 1B is an exemplary block diagram of an apparatus for estimating the power consumption, battery drain rate, and battery lifetime of a mobile communication terminal according to an embodiment of the present disclosure.

Referring to FIG. 1B, a mobile communication terminal 100 may be configured as follows in order to estimate the power consumption of a battery according to an embodiment of the present disclosure. For example, the mobile communication terminal 100 may largely include a battery interface 102, a battery characteristic training module 104, and a main estimation module (or controller) 114. The main estimation module 114 may include a process detection unit 106, an estimation unit 108, and a display unit 110. The estimation unit 108 may be further configured to interface with a battery estimation application developer 112.

For the convenience of description, it is assumed that the mobile communication terminal 100 operates on Android in FIG. 1B. However, embodiments of the present disclosure is also applicable to terminals operating on different Operating Systems (Oss) each having a built-in battery interface that provides battery information such as information about a battery temperature, a load voltage, an SoC, and the like.

The battery interface 102 corresponds to an afore-described API that provides battery information. The battery interface 102 is one of basic modules installed in a mobile communication terminal 100 operating on Android. The battery interface 102 provides battery information about the mobile communication terminal 100 to the estimation unit 108. The battery information may include information about the temperature of the battery, a terminal voltage, and the like.

The battery characteristic training module 104 may include, for example, an analyzer 104-1 and a storage 104-2. A Li-ion battery available to the mobile communication terminal 100 has a low chemical reaction capability at a low temperature, thus decreasing battery performance. As a consequence, the battery of the terminal is discharged faster in a low-temperature environment, such as a ski resort rather than at room temperature. Substantially, as the temperature of the battery is dropped, the total battery capacity is decreased and the internal resistance of the battery is increased. Therefore, if the current consumption of the mobile communication terminal 100 is estimated using the internal resistance of the battery acquired by training at a specific temperature in places having different ambient temperatures, a large error may occur.

When a battery drain rate and a battery lifetime are estimated, the accuracy of the total battery capacity may affect the accuracy of the battery drain rate and the battery lifetime. In this context, the power consumption and battery drain rate of the mobile communication terminal 100 are estimated by reflecting changes in the internal resistance and total battery capacity according to temperatures, in consideration of the effects of the temperature of an environment in which a user uses the mobile communication terminal 100 on the temperature of the battery in embodiments of the present disclosure. Thus, the analyzer 104-1 measures the temperature of the battery, executes an application that trains battery characteristics based on the measured temperature, builds a database with the resulting battery characteristic data, and stores the database in the storage 104-2 in embodiments of the present disclosure. The battery characteristic data may include information about internal resistances of the battery at temperatures of the mobile communication terminal 100, maximum available battery capacities at temperatures, and battery open-circuit voltages according to SoCs. The application for training battery characteristics based on the measured temperature may be executed per battery type.

Figure 2A:
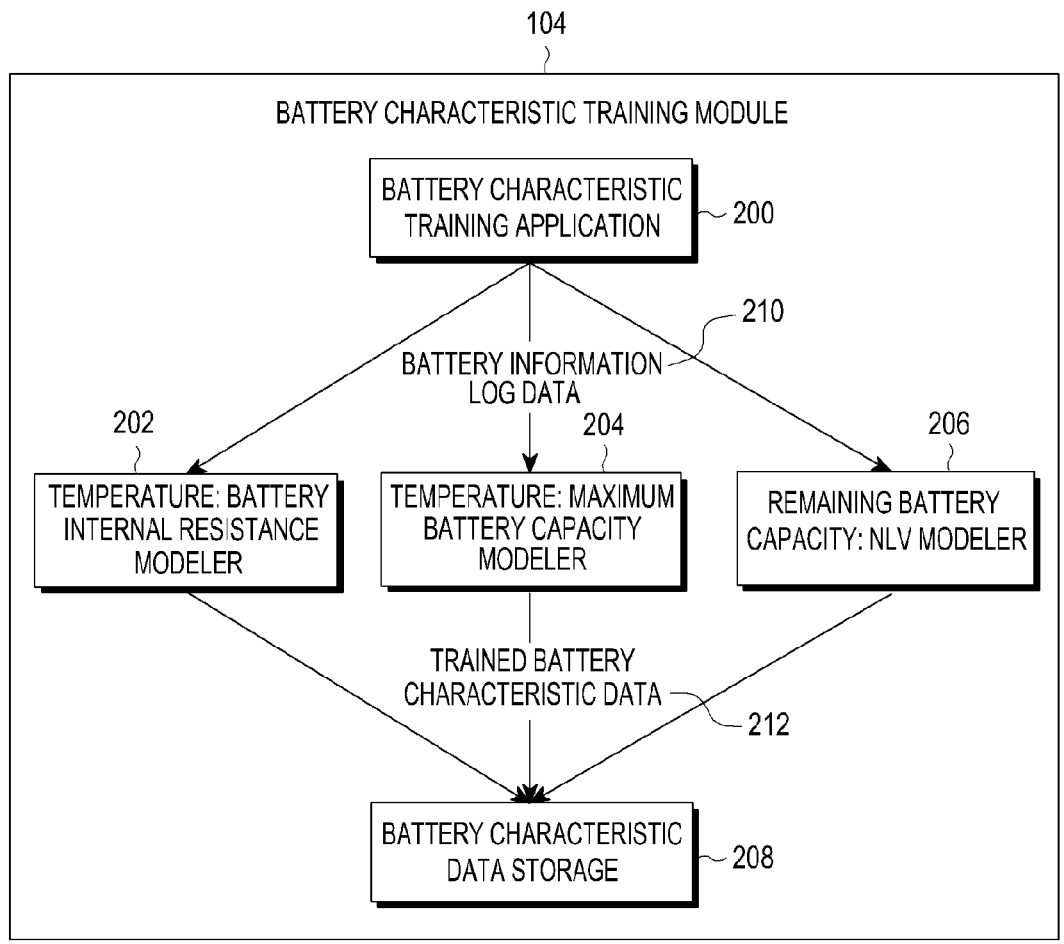
FIG. 2A is a detailed block diagram of an exemplary battery characteristic training module according to an embodiment of the present disclosure.

FIG. 2A is an exemplary detailed block diagram of a battery characteristic training module according to an embodiment of the present disclosure. For the convenience of description, the following description is given in the context of the battery characteristic training module 104 illustrated in FIG. 1B.

Referring to FIG. 2A, the battery characteristic training module 104 may operate based on a battery characteristic training application 200. The battery characteristic training application 200 may model battery internal resistances of the mobile communication terminal 100, maximum available battery capacities at temperatures, and open-circuit battery voltages according to SoCs, build a database with the modeling results, and transmit the database to the estimation unit 108.

Specifically, the battery characteristic training module 104 trains the characteristics of the mounted battery by executing the battery characteristic training application 200 and transmits battery information log data 210 resulting from the training to sub-modules 202, 204, and 206 for modeling the respective characteristics of the battery. The sub-modules 202, 204 and 206 comprise, for example: (a) a temperature: battery internal resistance modeler 202 for modeling battery internal resistances according to temperatures, (b) a temperature: maximum battery capacity modeler 204 for modeling maximum battery capacities according to temperatures, and (c) a remaining battery capacity: No-Load Voltage (NLV) modeler 206 for modeling open-circuit battery voltages according to SoCs.

The trained battery characteristic data 212 resulting from the modeling in the three sub-modules 202, 204, and 206 are stored in a battery characteristic data storage 208 and then provided to the estimation unit 108. For example, the trained battery characteristic data 212 may be represented as FIGS. 2B and 2C.

Figure 2B:
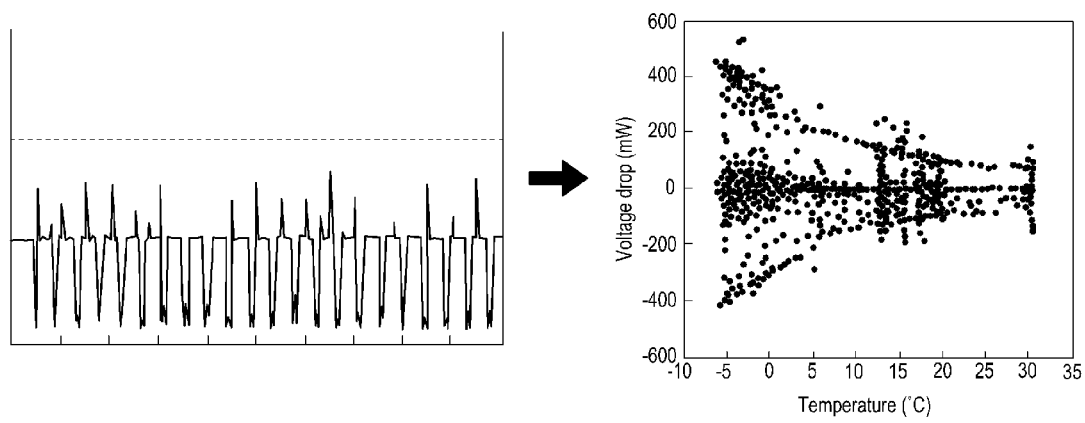
FIG. 2B is a graph illustrating a current flow pattern of a training operation, and voltage drop changes in an internal resistor of a battery, measured according to temperatures during current flow training operation according to an embodiment of the present disclosure.

FIG. 2B illustrates a current flow pattern of a training operation for modeling battery internal resistances according to temperatures and voltage drop changes at the measured battery internal resistances during current flow training. In this case, the results are achieved by placing a room-temperature terminal in a device capable of changing an ambient temperature (e.g., a freezer) and repeating an operation for flowing predetermined current through the terminal and then discontinuing the current flow for a predetermined time.

Figure 2C:
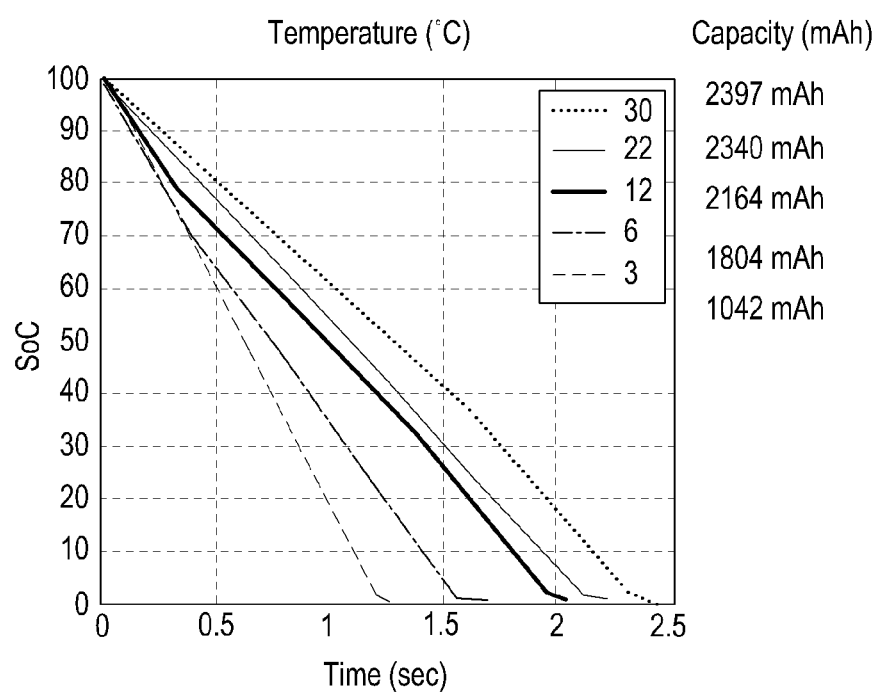
FIG. 2C is a graph illustrating a relationship between SoCs and operation times at a plurality of temperatures during an operation of a training application according to an embodiment of the present disclosure.

FIG. 2C is a graph illustrating SoCs according to temperatures. The graph shows SoCs over time, when a training application 200 that flows current, as illustrated in FIG. 2B, is executed. The SoCs have integers ranging from 0 to 100 and the values between the integer values of the SoCs are connected by a line on the graph. Numbers mapped to straight lines and dotted lines represent temperatures of the battery on the graph of FIG. 2C. As noted from FIG. 2C, the SoC is decreased more rapidly at a lower temperature. This may be interpreted as indicating that as the temperature of the battery drops, the total available battery capacity is reduced. To estimate the available battery capacity, a training application 200 may be executed so as to repeat an operation for flowing predetermined current for a predetermined time $T_t$ and discontinuing the current flow for a time period $T_b$. For example, the result graphs illustrated in FIGS. 3A and 3B may be acquired by the operation of the above training application 200.

Figure 3A:
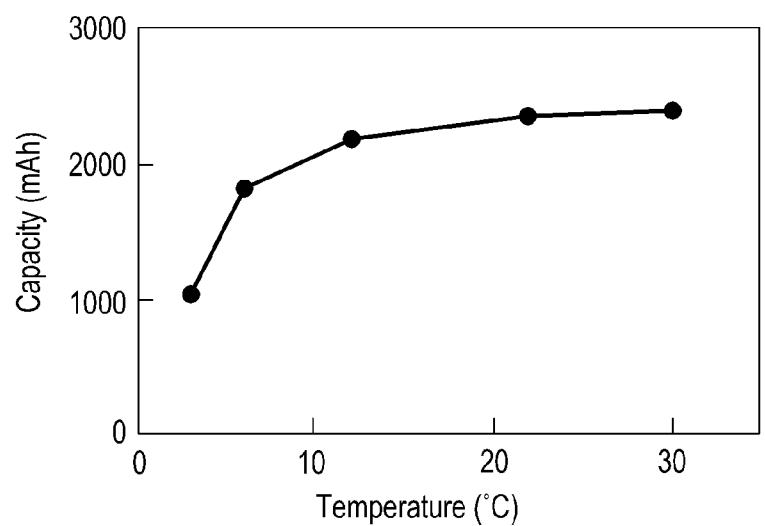
FIG. 3A is a graph illustrating a relationship between total battery capacities and temperatures, estimated by an operation of a training application according to an embodiment of the present disclosure.
Figure 3B:
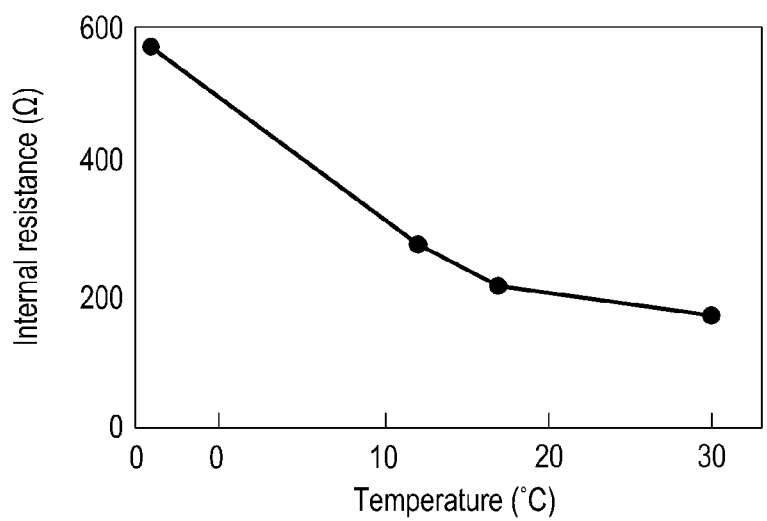
FIG. 3B is a graph illustrating a relationship between battery internal resistances and temperatures, estimated by an operation of a training application according to an embodiment of the present disclosure.

Referring to FIGS. 3A and 3B, it is noted that as the temperature drops, the total battery capacity is decreased and the internal resistance of the battery is increased.

Figure 3C:
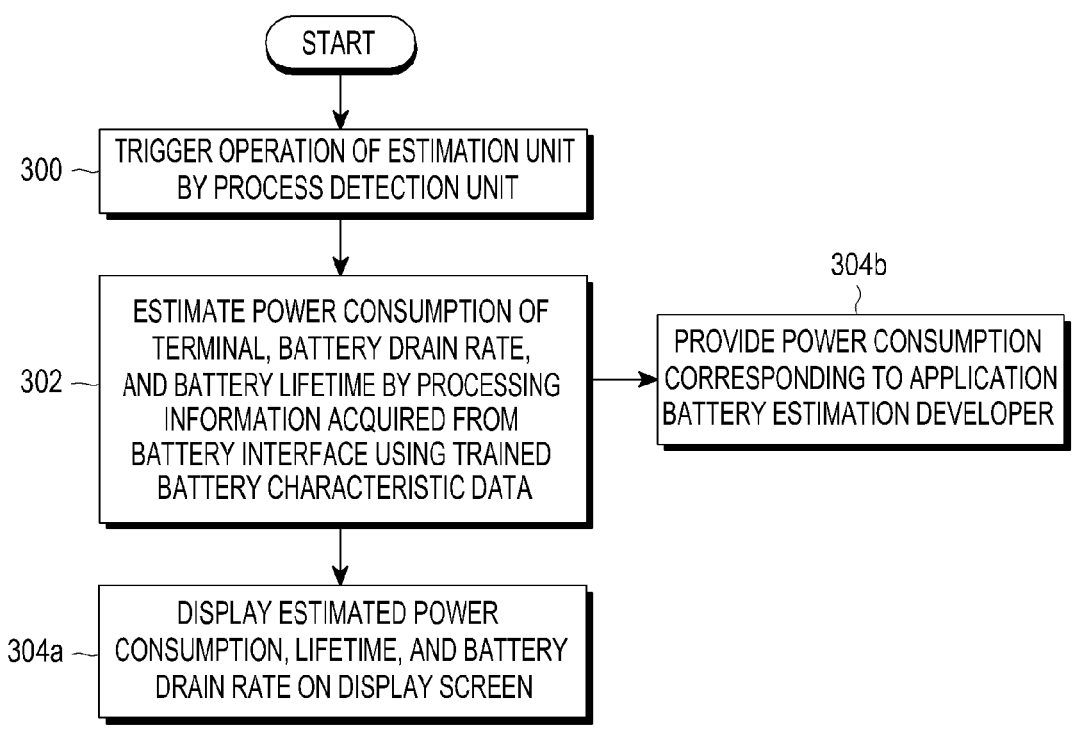
FIG. 3C is a flowchart illustrating an operation of an estimation unit illustrated in FIG. 1B according to an embodiment of the present disclosure.

FIG. 3C is an exemplary flowchart illustrating an operation of the estimation unit illustrated in FIG. 1B according to an embodiment of the present disclosure.

Referring to FIG. 3C, the process detection unit 106 detects that a specific application installed in the mobile communication terminal 100 or a specific function of the mobile communication terminal 100 is being executed for a time period equal to or longer than a predetermined threshold in step 300. The specific function may be a voice call, Internet browsing, a camera, or the like, in the mobile communication terminal 100. Then, the process detection unit 106 triggers the estimation unit 108 to estimate an instantaneous power consumption of the mobile communication terminal 100.

In step 302, the estimation unit 108 accesses the battery interface 102 and acquires battery information from the battery interface 102. The estimation unit 108 may estimate battery consumption state information using the acquired battery information (the temperature, voltage, and SoC value of the battery) and battery characteristic data. The battery consumption state information may include information about a power consumption, a moving average power consumption, a battery drain rate, and a battery lifetime in the mobile communication terminal 100.

Figure 4A:
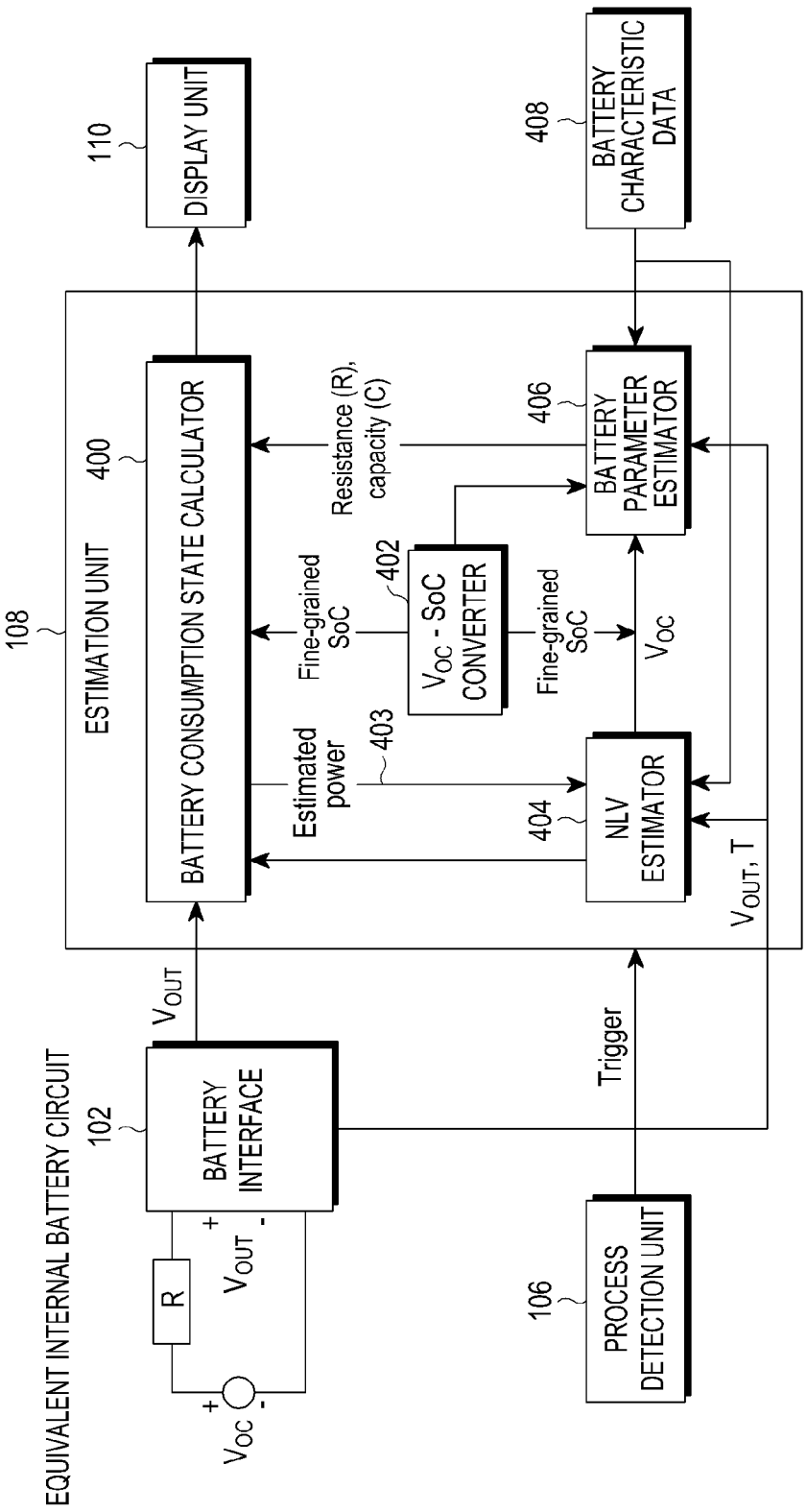
FIG. 4A is a block diagram illustrating an exemplary operation for estimating battery consumption state information about a mobile communication terminal in an estimation unit according to an embodiment of the present disclosure.

FIG. 4A is a block diagram referred to for specifically describing an exemplary operation for estimating battery consumption state information by the estimation unit 108 according to an embodiment of the present disclosure.

Referring to FIG. 4A, the estimation unit 108 may include, for example, a battery consumption state calculator 400, a $V_{oc}$-SoC converter 402, an NLV estimator 404, and a battery parameter estimator 406.

Figure 4B:
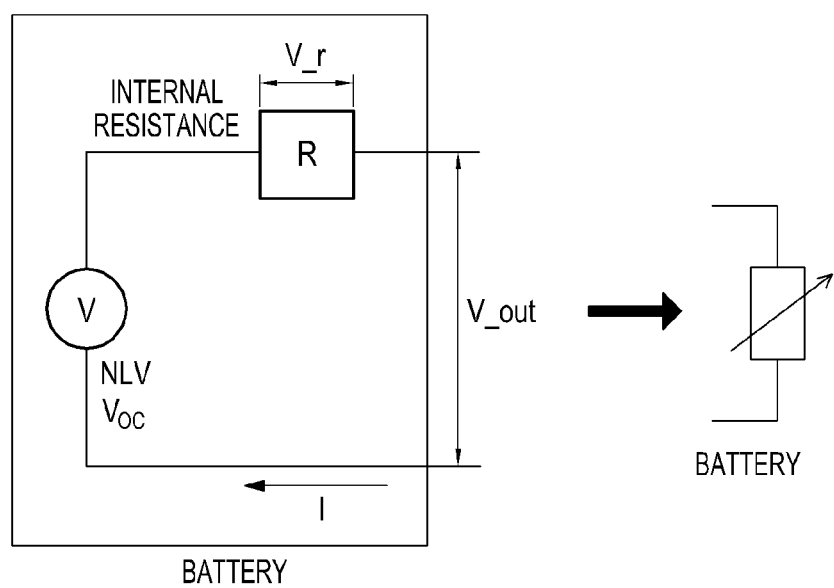
FIG. 4B is an equivalent circuit diagram viewed from a battery to a mobile communication terminal in the configuration illustrated in FIG. 4A.

FIG. 4B is a diagram illustrating an equivalent circuit viewed from the battery to the terminal and a relationship among the open-circuit battery voltage $V_{oc}$, the internal resistance R of the battery, a voltage drop $V_r$ in an internal resistor of the battery, and a load voltage $V_{out}$. The load voltage $V_{out}$ may be calculated by subtracting the voltage drop $V_r$ in the internal resistor of the battery from the open-circuit voltage $V_{oc}$ of the battery, as expressed in Equation 1.

$$V_{out}=V_{oc}-V_r \qquad \text{Eq. 1}$$

As described before with reference to FIG. 2A, the battery characteristic training module 104 controls flow of predetermined current in the terminal by executing the battery characteristic training application 200. For example, the battery characteristic training module 104 may control flow of predetermined current $I_t$ in the mobile communication terminal by repeating a floating-point computation. Or, the battery characteristic training module 104 may control flow of the predetermined current $I_t$ in the mobile communication terminal in a different manner. In this case, it is assumed that the current $I_t$ is measured preliminarily by means of an external measuring device and known. The battery characteristic training module 104 may flow predetermined current in the terminal 100 for the time period $T_t$ and estimate the internal resistance of the battery using the difference between $V_{OC}$ and $V_{OUT}$.

$V_{OC}$ of the previous resting operation may be approximated to $V_{OUT}$ of the current resting operation during current flow in the terminal. In other words, if little current flows in the terminal as during a resting period of a training operation, $V_{OC}$ may be approximated to $V_{OUT}$ by Equation 2

$$V_{out}=V_{oc}-V_r=V_{oc}-I\cdot r\approx V_{oc} \qquad \text{Eq. 2}$$

$V_{OC}$ estimated during the resting period may be regarded as $V_{OC}$ at the subsequent moment of flowing the current $I_t$ in the terminal. The battery characteristic training module 104 estimates the internal resistance of the battery by dividing the difference between $V_{OUT}$ at the moment of flowing the current $I_t$ in the terminal and $V_{OC}$ estimated during the previous resting period by $I_t$ according to Equation 3.

$$R=(V_{OC}-V\text{out})/I \qquad \text{Eq. 3}$$

Equation 3 is effective at an arbitrary temperature T. For example, it is assumed that a battery characteristic training application 200 is executed, which places the terminal in a temperature changing device continuously increasing or decreasing a temperature within a range of 40 degrees to −10 degrees and flowing the current $I_t$ in the terminal.

Figure 4C:
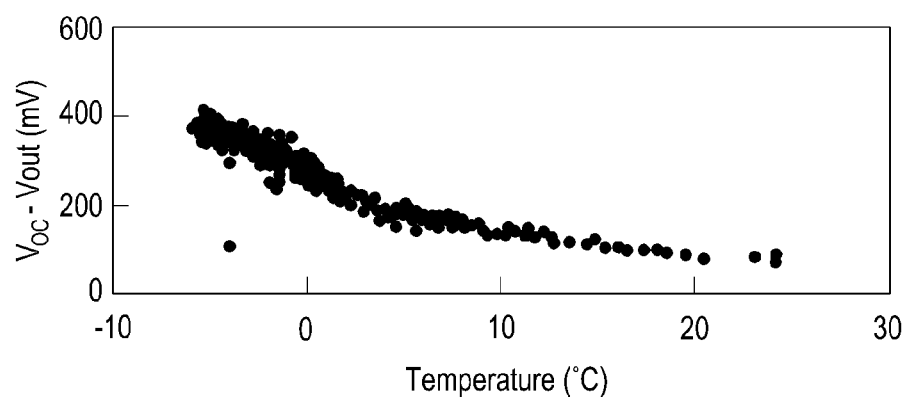
FIG. 4C is a graph illustrating results of voltage drop ($V_{oc}-V_{out}$) in an internal resistor of a battery according to temperatures according to an embodiment of the present disclosure.

Simultaneously with the execution of the battery characteristic training application 200, $V_{OUT}$ and $V_{OC}$ of the terminal may be estimated and the difference between $V_{OUT}$ and $V_{OC}$ may be calculated. As a consequence, a graph illustrating $V_{OC}$-$V_{OUT}$ results with respect to temperatures may be acquired as illustrated in FIG. 4C. The results of internal resistance according to temperatures may be acquired as illustrated in FIG. 3B, based on FIG. 4C and Equation 3. Specifically, an intended temperature: battery internal resistance graph may be acquired by calculating battery internal resistances by obtaining sufficient $V_{OC}$-$V_{OUT}$ samples with respect to temperatures and dividing a y-axis value per sample; that is, each of $V_{OC}$-$V_{OUT}$ values with respect to temperatures by $I_r$. To build a database with a battery internal resistance per temperature, an internal resistance value per predetermined temperature unit may be stored, or only internal resistance values corresponding to predetermined representative temperatures, for example, −10, 0, 10, 20, 30, and 40 Celsius degrees may be stored and internal resistance values for the remaining temperatures may be acquired by linear interpolation.

Battery information log data 210 resulting from training of the battery characteristic training application 200 are provided to the sub-modules 202, 204, and 206 for modeling respective battery characteristics. Since the sub-modules 202, 204, and 206 have been described before, a redundant description is not repeated here. Trained battery characteristic data 212 resulting from modeling at the three sub-modules 202, 204, and 206 are classified as battery characteristic data and provided to the battery parameter estimator 406. The battery characteristic training module 104 performs the training operation initially once and then the database is built. If the number of full charges/discharges of the battery is equal to or larger than a predetermined threshold, and thus, it is determined that the battery is aged, the battery characteristic data 400 may be changed. In this case, an additional training operation may be performed after a predetermined period for database update, for example, after one month.

Then, the battery parameter estimator 406 estimates a current battery internal resistance and a current available battery capacity corresponding to a current temperature based on the database of battery characteristic data 408 and provides the estimates to the battery consumption state calculator 400.

The NLV estimator 404 places the terminal in a state of little current consumption by terminating a background operation together with the display of the mobile communication terminal 100. Then, the NLV estimator 404 may estimate $V_{OC}$ by Equation 2 or using a SoC acquired from the battery interface 102 and a database of the battery characteristic data 408 in the remaining battery capacity: NLV modeler 206. Further, the NLV estimator 404 may correct the estimated $V_{OC}$ value by estimating an accumulated battery consumption in real time.

As described before, as the battery is discharged, the initial estimated $V_{OC}$ value is characteristically decreased gradually, as illustrated in [Table 1]. Therefore, to prevent an error of an estimated current value, which may occur over time, the NLV estimator 404 corrects $V_{OC}$ based on the characteristics in real time. Referring to Table 1, although y values are not linear with respect to the x-axis across all sections of the graph, the y-values may be linear-regression-approximated in the respective sections. Thus, this graph is piecewise-linearly approximated. Meanwhile, as the measurement period $t_s$ of the load voltage $V_{OUT}$ gets shorter, the time resolution of an estimated power consumption gets larger. However, in the case where a SoC is acquired through direct access to a system file of the battery interface 102, the measurement period $t_s$ of the load voltage $V_{OUT}$ may be adjusted in consideration of an additional power consumption increment.

The NLV estimator 404 may correct $V_{OC}$ in real time by decreasing $V_{OC}$ by as much as a consumed battery capacity using the power consumption and battery drain rate estimates of the mobile communication terminal 100. Let a sampling period be denoted by $t_s$ and a power consumption estimated at time i be denoted by P[i]. Then, an energy consumption during an arbitrary time period, that is, from time $t_1$ till time $t_k$ may be determined by Equation 4.

$$E(t_1, t_k) = \Sigma_{i=t_1}^{(t_k - t_1)/t_s}(P[i] \cdot t_s) \quad \text{Eq. 4}$$

In piecewise linearity, the inclination of a piecewise linear function of a SoC between "a SoC during an arbitrary time period" and "a SoC smaller than the SoC" may be expressed as $$a = \frac{V(SoC) - V(SoC - 1)}{SoC - (SoC - 1)}.$$

Herein, the inclination of a piecewise linear function means an average $V_{oc}$ decrement with respect to a 1% decrease of the SoC of the battery. Therefore, to decrease $V_{OC}$ by 1, 1/a % of a total battery energy should be consumed. Therefore, an accumulated energy consumption is calculated for every period from $t_1$ to $t_s$. If the accumulated energy consumption reaches (C/100), a (total battery energy 1/a %), $V_{OC}$ is decreased by 1. Here, C is the total battery energy. Then, the accumulated energy is set to an initial value by setting this time point as $t_1$ and the above operation is repeated, thus correcting $V_{OC}$.

According to the afore-described $V_{OC}$-$V_{ou}$ relationship equation, $V_{out} = V_{OC} - V_r = V_{OC} - IR$, $V_{OC}$ is always larger than $V_{out}$. Therefore, if the $V_{out}$ measurement is larger than $V_{OC}$, this means that $V_{OC}$ has been measured wrongly, and thus, the $V_{out}$ measurement is replaced with $V_{OC}$.

The NLV estimator 404 may continuously estimate the power consumption of the mobile communication terminal 100 by performing real time $V_{OC}$ correction according to the above two methods.

Each time battery information is changed in the battery interface 102, the NLV estimator 404 acquires the changed battery information, for example, using a BroadCastReceiver component of Android, or reads the battery information by directly accessing a system file. In this case, a load voltage may be read, for example, using a "cat/sys/class/power_supply/sec-fuelgauge/voltage_now" command.

The $V_{OC}$-SoC converter 402 estimates the SoC of the battery in a predetermined unit, for example, in a unit below 1% using $V_{OC}$ and provides the estimated SoC to the battery consumption state calculator 400 and the battery parameter estimator 406.

The battery consumption state calculator 400 may estimate instantaneous current $I_n$ (n is a sampling time) flowing through the mobile communication terminal 100 using a battery temperature and a load voltage read from the battery interface 102, an internal resistance and a battery capacity at a current temperature, acquired from the battery parameter estimator 406, and $V_{OC}$ estimated by the NLV estimator 404, by Equation 5.

$$I[n] = \frac{V_{oc}[n] - V_{out}[n]}{r} \quad \text{Eq. 5}$$

The battery consumption state calculator 400 calculates an instantaneous power consumption P(mW) using the estimated instantaneous current I and $V_{out}$ by Equation 6.

$$P[n] = I[n] \cdot V_{out}[n] \quad \text{Eq. 6}$$

The battery consumption state calculator 400 may calculate a moving average power consumption $\tilde{P}$ using an instantaneous power consumption P(mW) by Equation 7.

$$\tilde{P}[n]=(1-\beta)\cdot\tilde{P}[n-1]+\beta\cdot P[n] \qquad \text{Eq. 7}$$

where β is a weight applied to the current instantaneous power consumption to obtain the moving average power consumption. As β gets larger, the instantaneous power consumption is reflected more greatly in the moving average power consumption. As β gets smaller, the average is more heavily weighted. Because the instantaneous power consumption may fluctuate greatly, the moving average power consumption is used. In other words, the moving average power consumption is used to reduce fluctuation of a battery lifetime or a battery drain rate, and a power consumption of the terminal, which will be provided to the user, and show their average values. The battery consumption state calculator 400 estimates the battery lifetime L (h) using the estimated current I and a current available battery capacity $\tilde{C}$ (mAh) by Equation 8.

$$L = \frac{\tilde{C}}{I} \qquad \text{Eq. 8}$$

The battery consumption state calculator 400 calculates a battery drain rate $R_d$ (-%/h) using the estimated L. According to an embodiment of the present disclosure, the battery drain rate is defined as a decrease rate of an SoC per hour. Accordingly, the battery drain rate may be calculated by dividing the battery lifetime with respect to the total battery capacity by 100 as expressed in Equation 9.

$$R_d = \frac{100}{C/I} \qquad \text{Eq. 9}$$

For example, as shown in step 304a of FIG. 3C, the battery consumption state calculator 400 provides battery consumption state information including the instantaneous power consumption P, battery drain rate $R_d$, and battery lifetime L which have been estimated in the above operation to the display unit 110.

Figure 5:
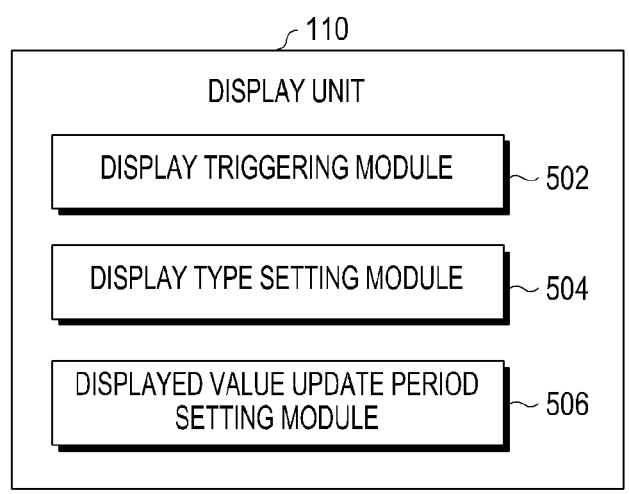
FIG. 5 is a detailed block diagram of a display unit according to an embodiment of the present disclosure.

FIG. 5 is a detailed block diagram of the display unit 110 according to an embodiment of the present disclosure.

Referring to FIG. 5, the display unit 110 may include, for example, a display triggering module 502, a display type setting module 504, and a displayed value update period setting module 506. If a user-set condition is satisfied or a predetermined amount of energy has been consumed for a predetermined time period, the display triggering module 502 triggers display of battery consumption state information about the battery displayed on a screen. The user-set condition may be, for example, execution of a specific application or function for a predetermined time. If the specific application or function has been executed for the predetermined time, battery consumption state information may be displayed. Or if a predetermined amount of energy is consumed by execution of the specific application or function, battery consumption state information may be displayed. The predetermined time and the predetermined amount of energy may be input arbitrarily by the user. Or a list of predetermined information units may be provided to the user so that the user may select an intended unit.

The display type setting module 504 may set a specific form in which the battery consumption state information is displayed on a screen. According to an embodiment of the present disclosure, one of three forms exemplary illustrated in FIGS. 6A, 6B, and 6C may be selected to display battery consumption state information on a screen.

Figure 6A:
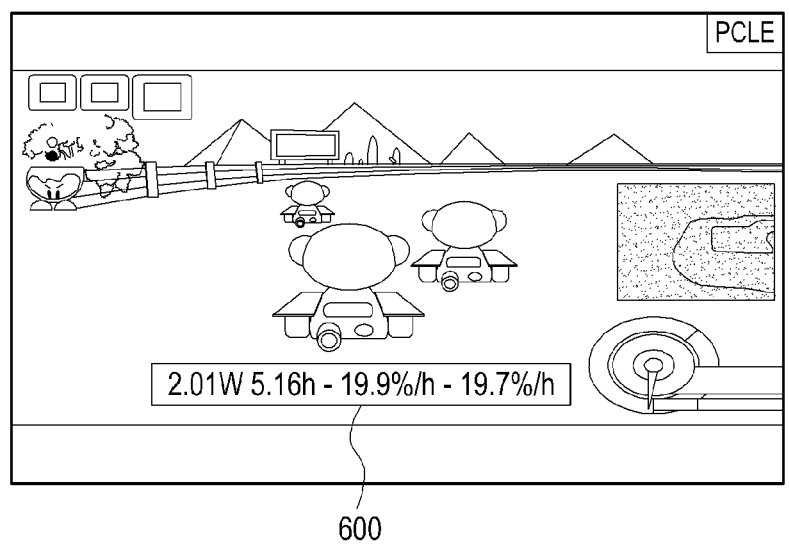
FIG. 6A illustrates an example of displaying battery consumption state information on a screen according to an embodiment of the present disclosure.

FIG. 6A illustrates display of battery consumption state information on a screen according to an embodiment of the present disclosure.

Referring to FIG. 6A, the display type setting module 504 may implement battery consumption state information using an Android toast function. According to the Android toast function, the battery consumption state information may be displayed as a temporary image in a part of a screen and then disappear from the screen.

Figure 6B:
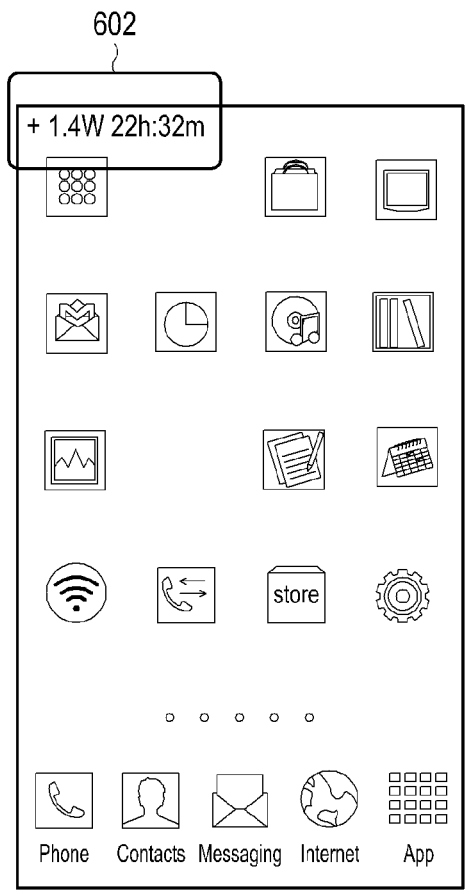
FIG. 6B illustrates another example of displaying battery consumption state information on a screen according to an embodiment of the present disclosure.

FIG. 6B illustrates another exemplary display of battery consumption state information on a screen according to an embodiment of the present disclosure.

Referring to FIG. 6B, the display type setting module 504 may display battery consumption state information using a status bar 602 on a screen. For example, the status bar 602 indicates a current power consumption W of the terminal and a battery lifetime in hours and minutes.

Figure 6C:
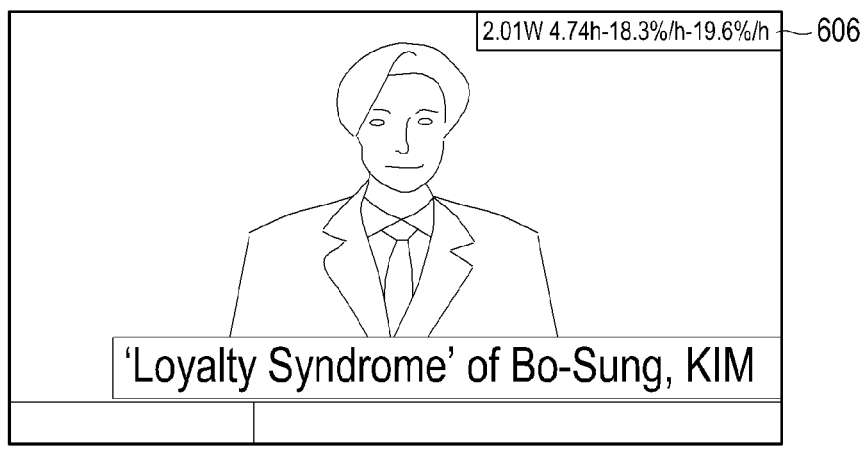
FIG. 6C illustrates another exemplary display of battery consumption state information on a screen according to an embodiment of the present disclosure.

FIG. 6C illustrates another exemplary display of battery consumption state information on a screen according to an embodiment of the present disclosure.

Referring to FIG. 6C, the display type setting module 504 may display battery consumption state information overlaid over a current screen on which a function used by the user is executed, for example, a video is played. In FIG. 6C, for example, battery consumption state information 606 is displayed overlaid on a left upper end of a screen. However, a position at which the battery consumption state information is overlapped may be set or changed directly by a user input according to an embodiment of the present disclosure.

The displayed value update period setting module 506 may set an update period of battery consumption state information. The user may also set the update period or select one of preset periods as the update period.

Meanwhile, a battery estimation application developer 112 (e.g., FIG. 1B) may access and use the battery consumption state information in step 304b. In this case, it is assumed that the battery estimation application developer 112 has received an estimated instantaneous power consumption value. Then, an energy consumption may be calculated by integrating the received power consumption. An average battery power consumed by execution of an application may be estimated by dividing the energy consumption by a training time based on the starting and ending times of execution of the application. In this case, the battery estimation application developer may develop an application that may be executed adaptively to the power consumption of a mobile communication terminal 100 using the average power consumption.

Figure 7A:
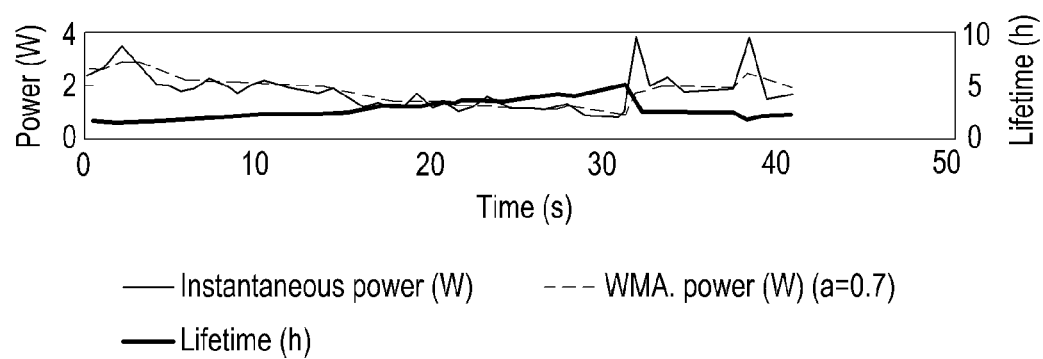
FIG. 7A is an exemplary graph illustrating battery consumption state information, when video data is received in a mobile communication terminal according to an embodiment of the present disclosure.

FIG. 7A is an exemplary graph illustrating battery consumption state information, when a mobile communication terminal receives video data according to an embodiment of the present disclosure.

Referring to FIG. 7A, it is assumed that the user is playing, for example, streaming video data in a mobile communication terminal 100. That is, the graph illustrates a battery lifetime, a received power consumption, and a Weighted Moving Average (WMA) of power consumption with respect to a play time of the streaming video data. A weight of 0.7 is applied to the WMA of power consumption. Time is represented in seconds. It is noted that as reception of the played video is discontinued at a time of 15 seconds, the instantaneous power consumption decreases and the battery lifetime increases.

FIG. 7B is an exemplary table comparing estimates and measurements of battery consumption state information, when a mobile communication terminal 100 receives video data according to an embodiment of the present disclosure.

Referring to FIG. 7B, an average of estimated average power consumption (the Avg. column of the Avg. power row) is not much different from an average of measured average power consumption (the Avg. column of the Measured power row) in the three experiments.

Figure 7C:
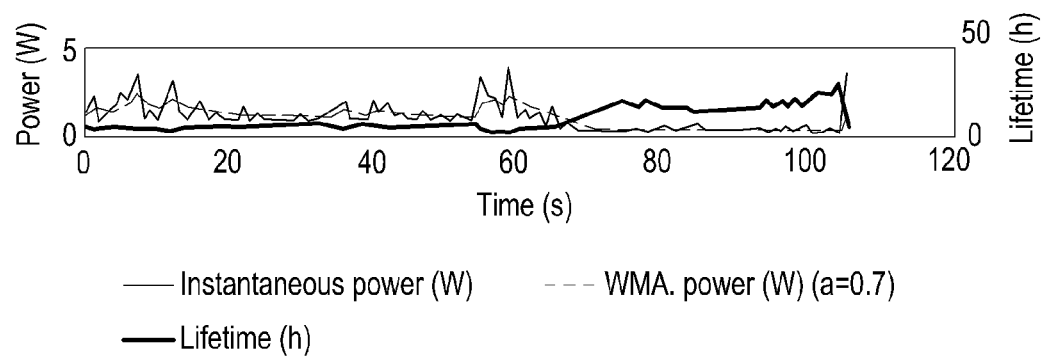
FIG. 7C is an exemplary graph illustrating battery consumption state information, when Web surfing is performed in a mobile communication terminal according to an embodiment of the present disclosure.

FIG. 7C is an exemplary graph illustrating battery consumption state information, when Web surfing is performed in a mobile communication terminal 100 according to an embodiment of the present disclosure, and FIG. 7D is an exemplary table comparing estimates and measurements of battery consumption state information, when Web surfing is performed in a mobile communication terminal according to an embodiment of the present disclosure.

It is noted generally that the graph and table of FIGS. 7C and 7D illustrate results that are not much different from the results of receiving video data.

In another embodiment of the present disclosure, a battery characteristic change caused by aging of a battery mounted in a mobile communication terminal 100 as well as a temperature of the mobile communication terminal 100 is considered. As described before, if a temperature decreases or aging progresses, a Li-ion battery, which is one of batteries available to the mobile communication terminal 100, has a reduced chemical reaction capability, and thus, degraded battery performance. Moreover, if the Li-ion battery is placed at a low temperature or aged long, its internal resistance increases and its available capacity decreases. As the battery is fully charged/discharged more times, the battery gets aged more. The following description will be given on the assumption that an aged battery is distinguished from a new battery depending on whether the number of full charges/discharges of a battery is equal to or larger than a predetermined number.

Figure 8A:
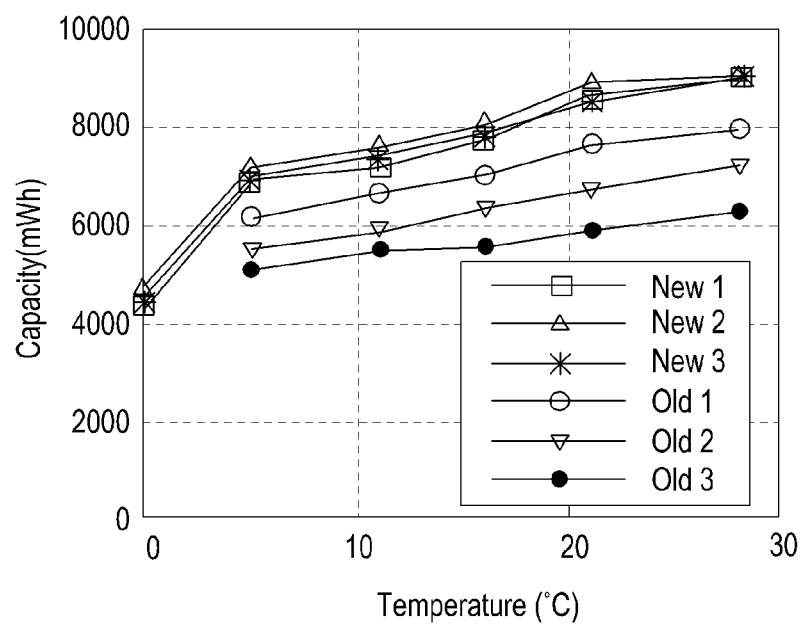
FIGS. 8A and 8B are exemplary graphs illustrating estimated available capacities and estimated internal resistances of a battery according to temperatures during a time period over which a fully charged battery is fully discharged.
Figure 8B:
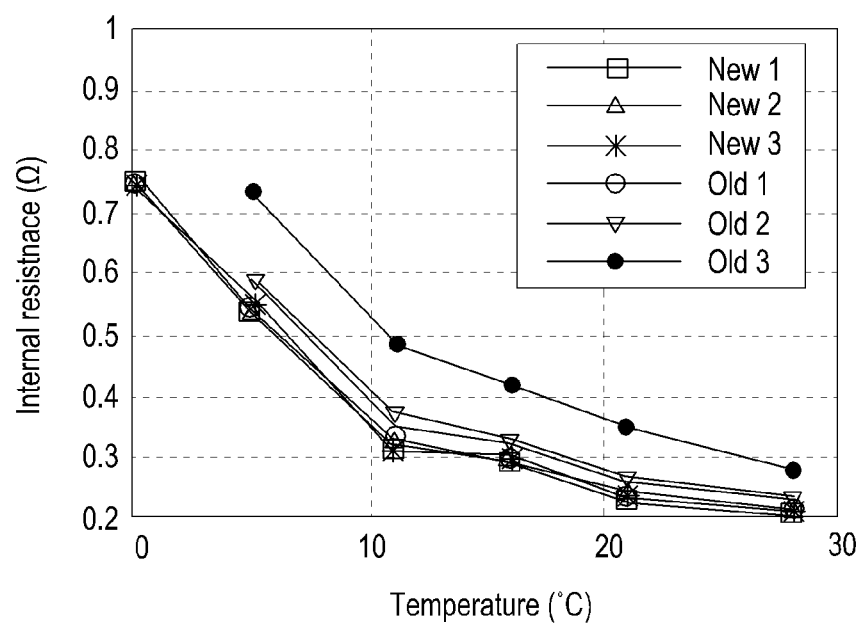

FIGS. 8A and 8B are exemplary graphs illustrating estimated available battery capacities and internal battery resistances with respect to temperatures during a time period over which a fully charged battery is fully discharged. Herein, the available capacities and the internal resistances are measured by repeating an operation for iteratively performing a floating-point computation consuming specific current in the battery and then discontinuing the floating-point computation during the time period. The graphs illustrate measurements of three new batteries which have never been used and three batteries which have been charged/discharged a predetermined number of or more times (hereinafter, referred to as 'aged batteries') in the same smartphone. The new batteries are denoted by "New 1", "New 2", and "New 3", respectively, and the aged batteries are denoted by "Old 1", "Old 2", and "Old 3", respectively on the graphs. It is assumed that the aged batteries have been charged/discharged different numbers of times equal to or larger than the predetermined number of times. As a battery is charged/discharged more times, it is aged more.

Referring to FIGS. 8A and 8B, compared to the new batteries, the aged batteries have decreased total capabilities and increased internal resistances at lower temperatures. The total battery capacity and internal resistance of a battery at a current state of the mobile communication terminal 100 may be expressed as Equation 10.

$$C(T,d_H) = \epsilon_t(T) \cdot \epsilon_a(d_H) \cdot C_f = \rho_c(T,d_H) \cdot C_f$$

$$r(T,d_H) = \mu_t(T) \cdot \mu_a(d_H) \cdot r_f = \rho_r(T,d_H) \cdot r_f \qquad \text{Eq. 10}$$

In Equation 10, $C(T,d_H)$ and $r(T,d_H)$ represent the total battery capacity C and internal resistance r of the battery at a current temperature T and a current aging degree $d_H$ of the battery. $C_f$ and $r_f$ represent the total battery capacity and internal resistance of a new battery at room temperature. $\epsilon_t$ and $\epsilon_a$ respectively represent ratios of a change $C_f$ in the total capacity with respect to the temperature and the aging state, and $\mu_r$ and $\mu_a$, respectively, represent ratios of a change $r_f$ in the internal resistance with respect to the temperature and the aging state.

In an embodiment of the present disclosure as described below, the power consumption state of a battery and a battery lifetime are estimated by reflecting the total battery capacity and internal resistance of the battery with respect to a temperature and aging without estimating the total capacity and internal resistance of the battery with respect to a temperature and aging under a controlled environment using a measurement device and building a database with the estimated values.

Embodiments of the present disclosure is implemented in the context of an operation of a smart device using a Li-ion battery having a built-in battery interface that provides a battery temperature, a battery voltage, and a residual battery capacity value. This operation of the smart device may be performed in an apparatus illustrated in FIG. 9A, which is configured by modifying the apparatus illustrated in FIG. 4A.

Figure 9A:
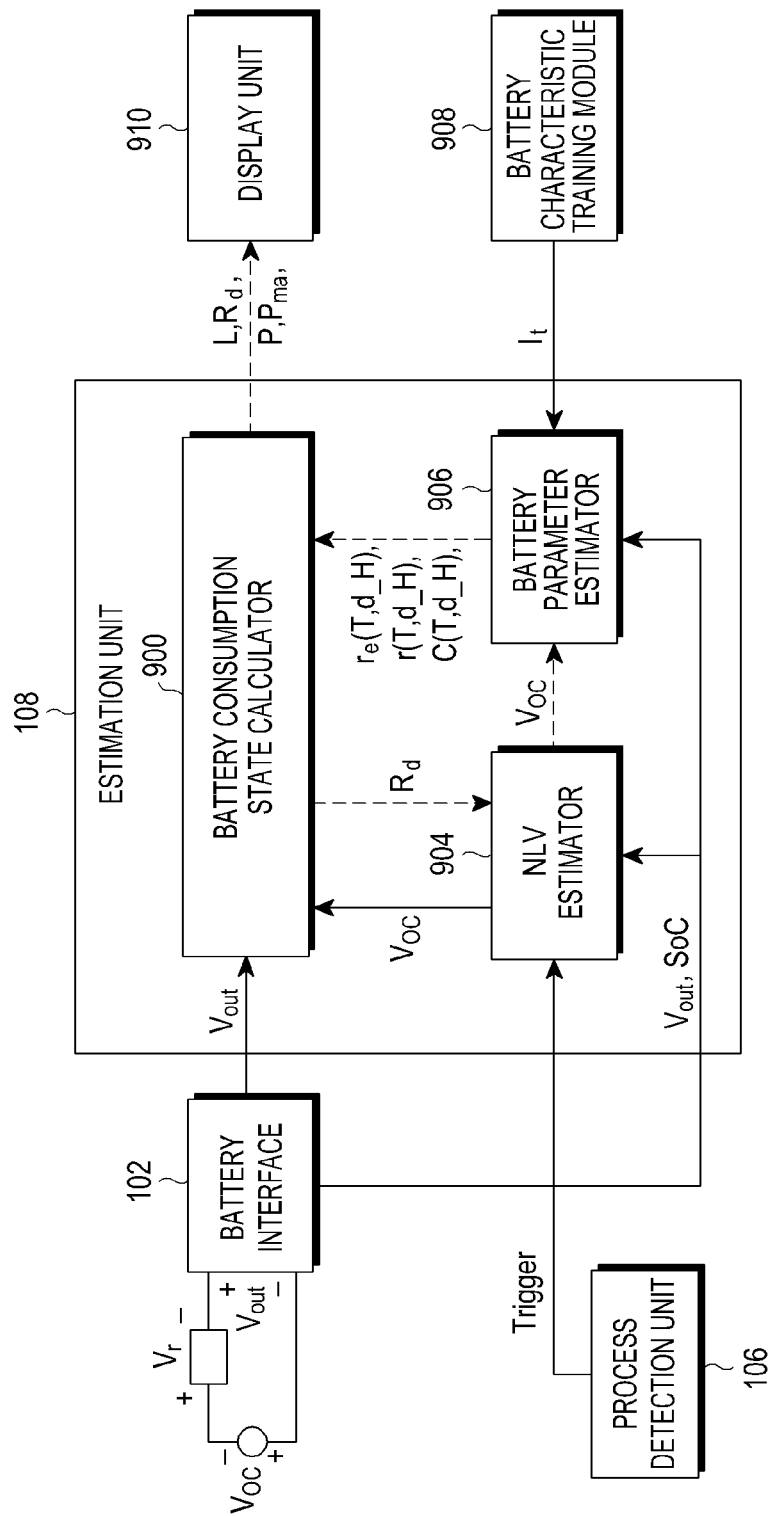
FIG. 9A is a block diagram of an apparatus according to another embodiment of the present disclosure.

Referring to FIG. 9A, the estimation unit 108 includes a battery consumption state calculator 900, an NLV estimator 904, and a battery parameter estimator 906 according to embodiments of the present disclosure. These components operate through interaction with each other. An estimation period $t_s$ of a battery drain rate estimated in the battery consumption state calculator 900 may be set to be equal to a measurement period of a load voltage, and the period may also be used in the NLV estimator 904 and the battery parameter estimator 906. Battery The other components operate in the same manner as their counterparts illustrated in FIG. 4A, and thus will not be described redundantly.

According to embodiments of the present disclosure, like the NLV estimator 404 illustrated in FIG. 4A, each time battery information is changed in the battery interface, the NLV estimator 904 acquires the changed battery information, or accesses to a system file and reads the battery information from the system file. Thus, the NLV estimator 904 may estimate a current NLV using a battery drain rate $R_d$ estimated by the battery consumption state calculator 900.

According to embodiments of the present disclosure, the battery parameter estimator 906 may estimate an effective resistance $r_e$ using the NLV estimated by the NLV estimator 904, and a load voltage and a SoC obtained from the battery interface. The battery consumption state calculator 900 may estimate a battery lifetime and a battery drain rate using the NLV estimated by the NLV estimator 904, the load voltage obtained from the battery interface, and the effective resistance $r_e$ estimated by the battery parameter estimator 906.

According to embodiments of the present disclosure, the NLV estimator 904 estimates the NLV to be a load voltage measured at a time point when it is determined that the terminal consumes almost no current. The time point may be determined by discontinuing a background operation of the terminal or all of applications executed in the terminal and thus minimizing power consumption.

While the battery of the terminal is being discharged, the NLV is decreased according to the amount of used battery power. Accordingly, the NLV estimator 904 may compensate for the decrement of the NLV by estimating an accumulated battery consumption during a time period over which embodiments of the present disclosure are implemented. To accumulate the battery consumption, the battery drain rate estimated by the battery consumption state calculator 900 is used. The NLV estimator 904 provides a current NLV in real time to the battery consumption state calculator 900. Then the battery consumption state calculator 900 calculates a battery drain rate using the NLV and provides the battery drain rate to the NLV estimator 904. The NLV estimator 904 may accumulate the received battery drain rate and compensate the battery drain rate in real time by applying the accumulated battery drain rate to a SoC-NLV relationship curve of the Li-ion battery.

Specifically, the time point may be determined by discontinuing a background operation of the terminal or all of applications executed in the terminal and thus minimizing power consumption in order to estimate an initial NLV in embodiments of the present disclosure. In this case, a load voltage and an NLV are almost equal and thus the NLV estimator 904 may approximate the load voltage to the NLV. Then, the NLV estimator 904 updates the NLV in real time using the initial NLV. That is, the NLV estimator 904 estimates the NLV in every period of $t_s$ with respect to the initial NLV and provides the estimated NLV to the battery consumption state calculator 900.

In embodiments of the present disclosure, characteristics between SoC and NLV, for example, an NLV corresponding to a changed SoC may be acquired from the database of the remaining battery capacity: NLV modeler 206 within the battery characteristic data 408 of FIG. 4A. It is assumed that the database of the remaining battery capacity: NLV modeler 206 is stored in the NLV estimator 904. Since the SoC is represented in units of 1%, an NLV corresponding to a SoC between two adjacent SoC levels may be estimated by linear interpolation. Specifically, an NLV $V_{oc}[t_k]$ at a specific sample time $t_k$ during real time may be expressed as Equation 11.

$$\Delta V_{oc}[t_k] = (f(S[t_k]) - f(S[t_k]-1)) \cdot (R_d[t_{k-1}] \cdot t_s/3600)$$

$$V_{oc}[t_k] = \max(V_{oc}[t_{k-1}] - \Delta V_{oc}[t_k], f(S[t_k]-1)) \quad \text{Eq. 11}$$

where $\Delta V_{oc}[t_k]$ represents the amount of an NLV estimated to have been dropped during a time period between a previous sample time $t_{k-1}$ and a current sample time $t_k$. $R_d[t_{k-1}]$ is a battery drain rate estimated at the previous sample time by the battery consumption state calculator 900, and $t_s$ is a sample period. That is, $R_d[t_{k-1}]*t_s$ is an estimated battery consumption (%) during the time period between the previous sample time and the current sample time. $S[t_k]$ represents a SoC at $t_k$, and $f(S[t_k])$ represents an NLV mapped to the SoC at $t_k$ in a database. Accordingly, $f(S[t_k])-f(S[t_k]-1)$ is the inclination of a linearly interpolated $V_{OC}$-SoC graph at a current SoC.

That is, the NLV estimator 904 may estimate a battery consumption at each sample time and estimate a decrement of an NLV by multiplying the a SoC-NLV inclination linearly interpolated using a database of data mapped to a total of 100 SoCs each being represented in units of 1% by the battery consumption. The NLV estimator 904 may estimate a current NLV $V_{oc}[t_k]$ by subtracting the estimated NLV decrement from an NLV for the previous sample time. The NLV may be set to have a predetermined lowest limit of $f(S[t_k]-1)$ and wrong estimation of the NLV to be a low value may be prevented using the lowest limit.

The NLV estimator 904 provides its estimated NLV to the battery parameter estimator 906, receives a battery drain rate estimated by the battery consumption state calculator 900, and then estimates an NLV of a next sample. If the load voltage is equal to or higher than the NLV during estimation of the NLV using the battery drain rate, the NLV estimator 904 replaces the NLV with the load voltage immediately. The replacement is performed to fast recover a wrong NLV close to an actual NLV. The operation algorithm of the NLV estimator 904 is illustrated in FIG. 10.

According to an embodiment of the present disclosure, the battery parameter estimator 906 defines the effective resistance $r_e$ as Equation 12 below, estimates the effective resistance $r_e$, and provides the estimated effective resistance $r_e$ to the battery consumption state calculator 900.

$$r_e(T, d_H) = \varepsilon_t(T) \cdot \varepsilon_a(d_H) \cdot \mu_t(T) \cdot \mu_a(d_H) \cdot r_f \quad \text{Eq. 12}$$
$$= \rho_a(T, d_H) \cdot r(T, d_H),$$

where the effective resistance $r_e$ (T, $d_H$) is calculated by multiplying the current resistance $\mu_t(T) \cdot \mu_a(d_H) \cdot r_f$ of the battery by a variation of the total battery capacity $\varepsilon_t(T) \cdot \varepsilon_a(d_H)$ with respect to a temperature and aging. The effective resistance $r_e$ is obtained using an algorithm described with reference to FIG. 11 by the battery parameter estimator 906. First, the battery parameter estimator 906 receives an estimated NLV in real time from the NLV estimator 904. Then, the battery parameter estimator 906 multiplies a value obtained by subtracting a load voltage from the NLV by the sample time $t_s$ while the battery is being consumed by 1%, thus accumulating the value. Then, the effective resistance $r_e$ is estimated by dividing the accumulated value by the battery capacity $C_f$ and multiplying the resulting value by 100. The effective resistance $r_e$ estimated at the moment when the SoC reaches (n) % may be calculated by Equation 13 below using an accumulative value of the difference between the load voltage and the NLV.

$$r_e = \frac{100 \cdot \sum_{t_k \in [t^n, t^{n-1}]} (V_{oc}[t_k] - V_{out}[t_k]) \cdot t_s / 3600}{C_f} \quad \text{Eq. 13}$$

where $t^n$ is a sample time corresponding to the moment when the SoC reaches n and adding $V_{oc} - V_{out}$ to a time period $[t^{(n+1)}, t^n]$ means accumulating values obtained by multiplying the differences between load voltages and NLVs by the sample period. That is, the effective resistance $r_e$ may be estimated using an accumulated value of SoCs during a predetermined time and $C_f$.

According to embodiments of the present disclosure, the effective resistance $r_e$ may be updated in real time during real time and may reflect a variation in a current temperature and an aging state using a moving average and an appropriate weight. The present disclosure may reflect the effect of a temperature and an aging state on total battery capacity and internal resistance of the battery without modeling, using the effective resistance $r_e$. That is, the battery consumption state calculator 900 uses the effective resistance $r_e$ in calculating a battery drain rate $R_d$ and a battery lifetime L.

A training application within the battery characteristic training module 908 may be defined, which repeats an operation for consuming an almost constant amount of power like the operation of the battery characteristic training module 104 illustrated in FIG. 1B, and a current internal resistance $r(T, d_H)$ of the battery may be estimated using the training application within the battery characteristic training module 908. A current total available battery capacity C(T, $d_H$) may be estimated using the estimated internal resistance r(T,$d_H$), $r_e$, and $C_f$. According to this method, a current internal resistance and total battery capacity can be estimated. The battery consumption state calculator 900 uses the estimated internal resistance of the battery in obtaining an instantaneous power consumption.

According to embodiments of the present disclosure, the battery consumption state calculator 900 provides a battery drain rate, for example, in every period of $t_s$. The battery consumption state calculator 900 interacts with the NLV estimator 904 and the battery parameter estimator 906 in real time. The battery drain rate $R_d$ (%/h) is defined as a decrease rate of a SoC per unit time. The battery lifetime and the battery drain rate are a function of an effective resistance, a current total battery capacity C, a SoC in units of %, and current I consumed currently by the terminal, expressed as Equation 14 below:

$$R_d[t] = \frac{100}{C(T, d_H)/I[t]} = \frac{100}{C(T, d_H)/\left(\frac{V_{oc}[t] - V_{out}[t]}{r(T, d_H)}\right)} \quad \text{Eq. 14}$$

$$= \frac{100 \cdot (V_{oc}[t] - V_{out}[t])}{C(T, d_H) \cdot r(T, d_H)}$$

$$= \frac{100 \cdot (V_{oc}[t] - V_{out}[t])}{\varepsilon_t \cdot \varepsilon_a \cdot C_f \cdot \mu_t \cdot \mu_a \cdot r_f}$$

$$= \frac{100 \cdot (V_{oc}[t] - V_{out}[t])}{C_f \cdot r_e},$$

$$L[t] = \frac{C(T, d_H) \cdot S[t]}{I[t]} = (100/R_d[t]) \cdot S[t]$$

where $C_f$ represents a total battery capacity of a new battery at room temperature, r represents an internal resistance of the battery, $V_{oc}$ represents an NLV, and $V_{out}$ represents a load voltage. A voltage drop $V_r$ of an internal battery resistor, the current I consumed by the terminal, the NLV, and the load voltage $V_{out}$ are placed in the relationship $V_r = I \cdot r = V_{oc} - V_{out}$. The battery drain rate may be calculated using the estimated NLV, load voltage $V_{out}$, $r_e$, and $C_f$ by modifying Equation 14 and $C_f$ may be acquired from the specification of the battery.

According to embodiments of the present disclosure, the battery parameter estimator 906 may estimate a current internal resistance of the battery by executing the training application within the battery characteristic training module 908 consuming power of a constant value and thus performing an additional measurement operation through an internal resistance measurement application, and may estimate the current I flowing through the terminal using the estimated internal resistance of the battery. The battery parameter estimator 906 may acquire an instantaneous power consumption P by multiplying a load voltage $V_{out}$ by the estimated current I. In other words, the battery consumption state calculator 900 may receive an NLV from the NLV estimator 904 and an effective resistance $r_e$ from the battery parameter estimator 906, and estimate a battery drain rate in real time. Then the battery consumption state calculator 900 provides the estimated battery drain rate in real time to the NLV estimator 904, thus helping the NLV estimator 904 to estimate an NLV.

As described above, the NLV estimator 904, the parameter estimator 906, and the battery consumption state calculator 900 may estimate an accurate battery drain rate in every period of $t_s$ by interacting with each other. Subsequently, the battery drain rate estimated by the battery consumption state calculator 900 may be displayed on the display of the terminal so that the user may view the battery drain rate or a developer may use the battery drain rate through an API.

Figure 9B:
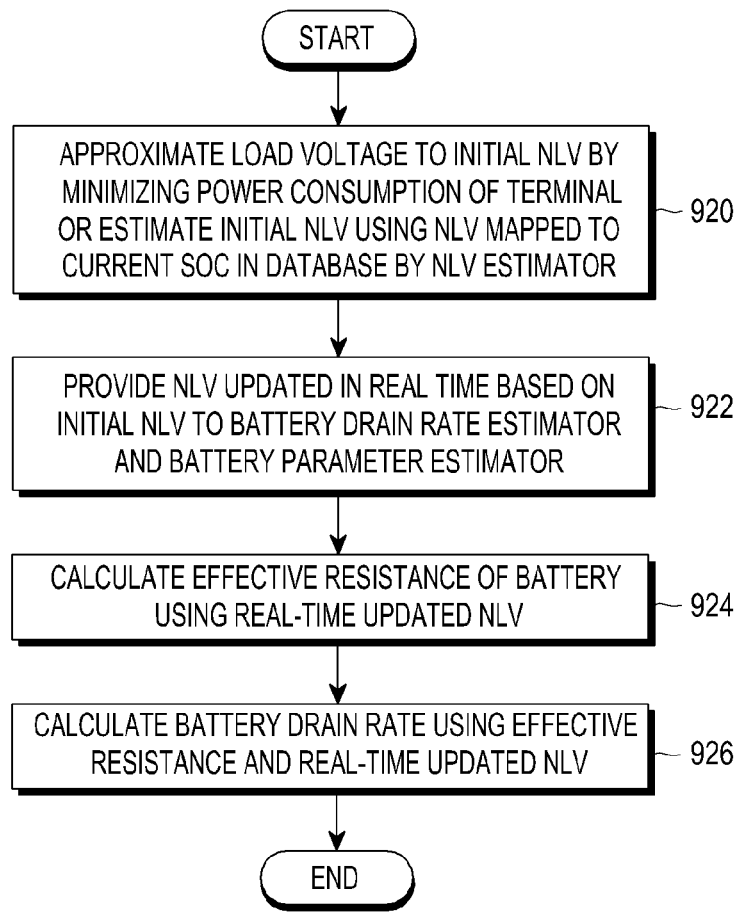
FIG. 9B is a flowchart illustrating an operation of the apparatus illustrated in FIG. 9A according to an embodiment of the present disclosure.

FIG. 9B is an exemplary flowchart illustrating an operation of the apparatus illustrated in FIG. 9A.

Referring to FIG. 9B, in step 920, the NLV estimator 904 approximates a load voltage to an initial NLV by discontinuing a background operation of the terminal or all of applications in progress, or estimates an initial NLV by mapping a current SoC to an NLV in an NLV-SoC database.

In step 922, the NLV estimator 904 estimates a current NLV using an NLV decreased from the initial NLV at every sample time and a SoC mapped in at least units of 1% and provides the updated estimated NLV in real time to the battery consumption state calculator 900 and the battery parameter estimator 906.

In step 924, the battery parameter estimator 906 calculates an effective resistance of the battery using an NLV updated in real time, received from the NLV estimator 904, by Equation 12 and Equation 13, shown above, and provides the effective resistance to the battery consumption state calculator 900.

In step 926, the battery consumption state calculator 900 may calculate a battery drain rate using the effective resistance and the real-time updated estimated NLV received from the NLV estimator 904 by Equation 14. The operation of each step in FIG. 9B is identical to the operation of a component associated with the step illustrated in FIG. 9A and thus its description will not be repeated here again.

According to the above-described embodiment of the present disclosure, the battery drain rate of a smart device may be estimated in real time and a video streaming operation may be performed with its play time ensured, using the battery drain rate irrespective of the type or aging state of the battery. For example, hyper text transfer protocol (HTTP) adaptive streaming over HTTP (DASH) is a technology at an application end, which enables a ultra high definition (UHD) video to be viewed without interruptions by controlling the bit rate of an appropriate video according to the link state between a video server and the terminal. A video quality corresponding to a current battery drain rate can be provided to the user by comparing a play time corresponding to an intended video quality, that is, a battery consumption amount with a current battery drain rate in a combination of DASH and the battery drain rate estimation scheme of the present disclosure. In a specific example, if a continuous play time of a video at a user-intended quality cannot be ensured due to too high a battery drain rate, the battery drain rate may be decreased by requesting a lower-quality video. That is, a video stream service can be provided in consideration of both a battery lifetime and a video quality by requesting a highest-quality video that satisfies a target continuous play time.

Further, in the battery drain rate estimation scheme according to embodiments of the present disclosure, as a current battery drain rate of a user is estimated and provided to an application developer through an API, the smart device application developer may control an operation of a smart device adaptively to the battery drain rate of the user.

Since embodiments of the present disclosure provides an apparatus and method for estimating a battery drain rate in consideration of the aging state of a battery even though the aging state of the battery is not known, the limitation facing the conventional method for estimating a battery drain rate (i.e., a battery lifetime estimated without considering a decrease in the capacity of the battery caused by the aging of the battery may be different from an actual battery lifetime) can be overcome. Particularly, since the battery drain rate is estimated by reflecting the aging state of the battery without a special training operation during a real time, the aging state of the battery can be updated continuously. The conventional technology of obtaining a battery drain rate each time a SoC is reduced by 1% provides a battery drain rate in a long update period. Thus, if a terminal often switches between various operations, the conventional technology has limitations in providing an accurate battery drain rate. In contrast, another embodiment of the present disclosure provides a battery drain rate in a very short update period. Therefore, even though a terminal often switches between operations, the battery drain rate may be accurately provided in real time.

Figure 12A:
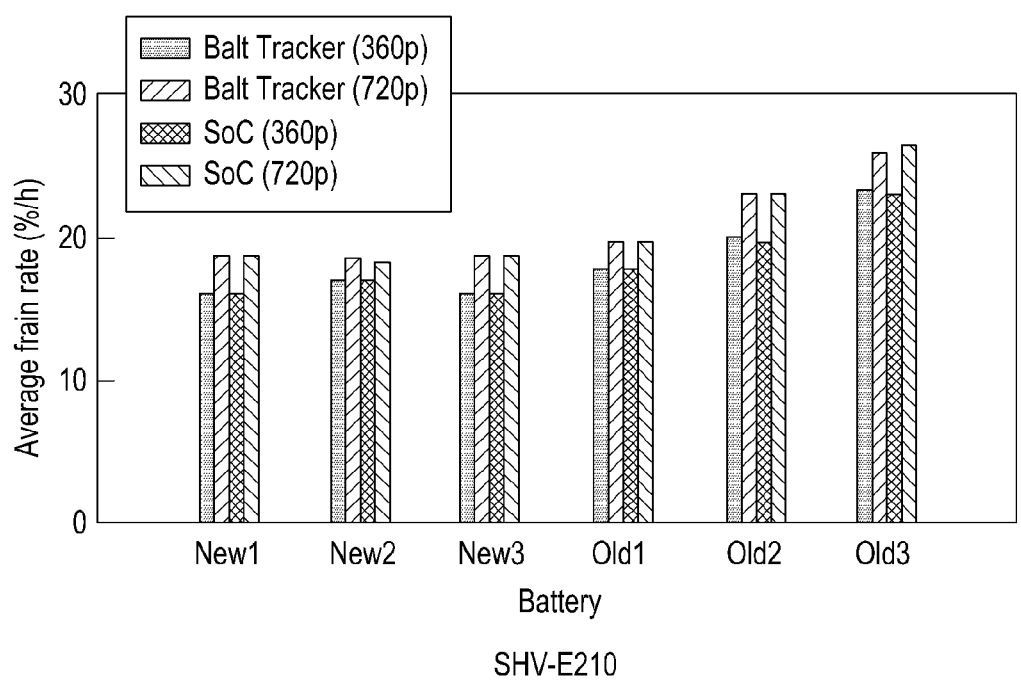
FIGS. 12A and 12B are exemplary graphs illustrating evaluated performances of six batteries and four batteries in two types of smart devices according to an embodiment of the present disclosure.
Figure 12B:
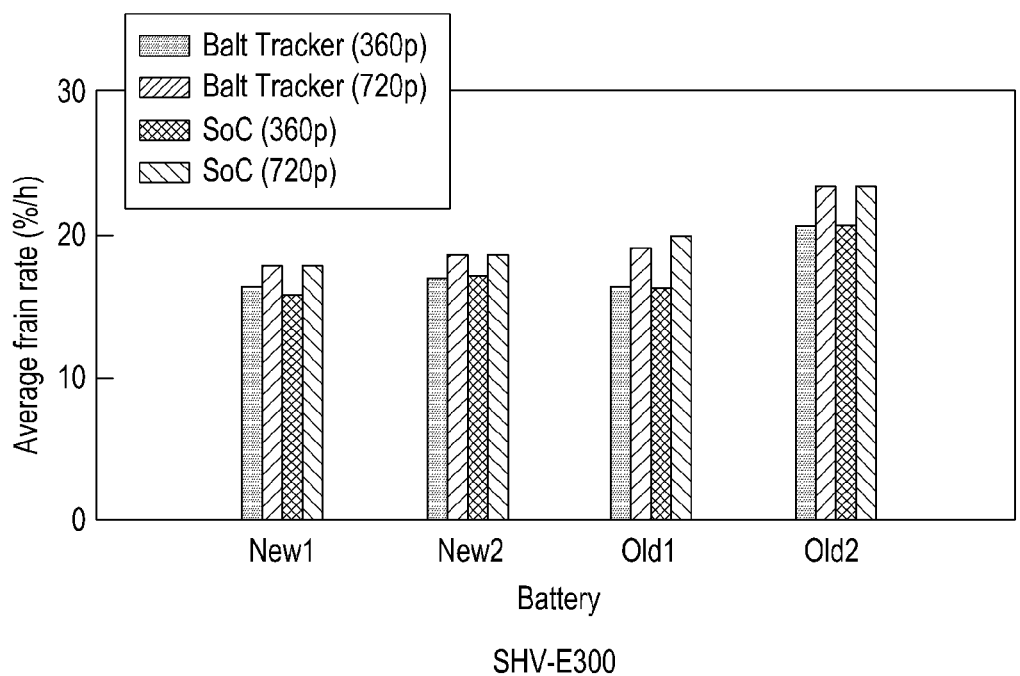

FIGS. 12A and 12B are exemplary graphs illustrating evaluated performances of six batteries and four batteries in two types of smart devices according to an embodiment of the present disclosure. As described before with reference to FIGS. 8A and 8B, three new batteries and three aged batteries are mounted in the same device and their performance is evaluated. It is assumed that the batteries are more aged in the order of old1<old2<old3. In the legend, SoC represents an average battery drain rate calculated using a time taken to consume 1% of a battery. That is, SoC represents an actual battery drain rate calculated by dividing a SoC decrement by a measurement time during measurement.

BattTracker represents an index indicating an evaluation of an average battery drain rate based on the proposed algorithm. The algorithm indicates a battery drain rate in real time and an average of the measurement times of the battery drain rate is BattTracker.

Referring to FIG. 12, it is noted that an actual battery drain rate varies with the aging degree of a battery and the resolutions (360p and 720p) of a video, and SoC and BattTracker are measured without great errors. Actual measurement is performed without any special training operation and it is observed that a battery drain rate can be obtained with a small error by applying an aging state to a real time.

Figure 13:
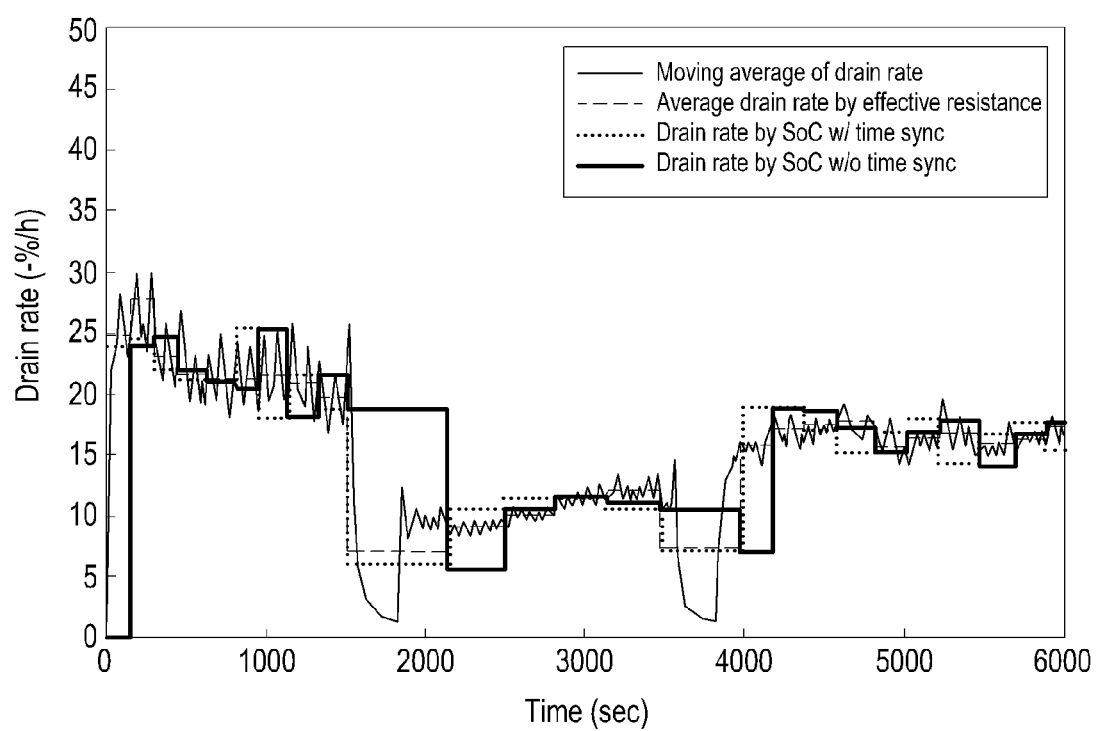
FIG. 13 is an exemplary graph illustrating battery drain rates which are measured in real time, while a plurality of applications are being executed in a smart device equipped with an aged battery according to an embodiment of the present disclosure.

FIG. 13 is a graph illustrating real-time measurements of battery drain rates during execution of a plurality of applications in a smart device equipped with an aged battery according to an embodiment of the present disclosure.

Referring to FIG. 13, Drain rate by SoC w/o time sync. represents a battery drain rate calculated using a time taken to consume a battery by 1%. However, the result is obtained after the battery is actually consumed by 1%. Thus, the previous estimated drain rate is used until the battery is again consumed by 1%. Therefore, if the terminal changes its operation, a very inaccurate result that is not related to the actual operation may be shown. Drain rate by SoC w/time sync. represents the result of synchronizing the value of Drain rate by SoC w/o time sync. to an actual time of battery consumption. That is, Drain rate by SoC w/time sync. is an index indicating a battery drain rate in real time during 1% consumption of the battery. Moving average of drain rate represents a moving average of real-time battery drain rates calculated in a proposed algorithm according to an embodiment of the present disclosure. A moving average weight is set to 0.9. Average drain rate by effective resistance represents a result of averaging battery drain rates calculated in the present disclosure by a unit time over which the battery is consumed by 1%. Since Average drain rate by effective resistance and Drain rate by SoC w/time sync. have a very small error, it may be determined that embodiments of the present disclosure can provide an accurate battery drain rate irrespective of the types of a terminal and a battery or even though the terminal performs various operations. Further, if a time taken to consume 1% of the battery is compared with Drain rate by SoC w/o time sync, a battery drain rate can be obtained in every update period using a proposed algorithm of the present disclosure even when the terminal switches between various operations.

As is apparent from the foregoing description of the present disclosure, since a battery consumption state is estimated more accurately, a user can control the power of a mobile communication terminal more efficiently.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for providing battery consumption state information of an electronic device, the method comprising:
   obtaining battery information changing according to a temperature and an aging state of a battery supplying a power to the electronic device;
   determining a minimum consumption voltage at a second time based on a consumption of a battery capacity and a battery voltage obtained by minimizing a power used in the electronic device at a first time preceding the second time;
   determining a consumption rate of the battery capacity based on the battery information and the minimum consumption voltage; and
   displaying the battery consumption state information comprising the determined consumption rate of the battery capacity.

2. The method of claim 1, wherein the battery information includes an internal resistance of the battery.

3. The method of claim 2, further comprising:
   calculating a lifetime of the battery using a current of the electronic device and an available capacity of the battery,
   wherein the current is obtained based on the battery voltage, the minimum consumption voltage, and the internal resistance.

4. The method according to claim 3, wherein the displaying comprises displaying the lifetime with the battery consumption state information.

5. The method according to claim 1, wherein the determining the consumption rate of the battery comprises;
   updating the minimum consumption voltage in real time based on consumption estimates of the battery capacity estimated during a predetermined time interval;
   calculating an effective resistance of the battery using the updated minimum consumption voltage; and
   estimating the consumption rate of the battery in real time based on the effective resistance.

6. The method according to claim 5, wherein the calculating the effective resistance comprises:
   obtaining a difference value by subtracting the updated minimum consumption voltage from the battery voltage and multiplying the difference by a sample time during consumption of a predetermined unit of charge in the battery; and
   calculating a result of the multiplying as the effective resistance.

7. The method according to claim 1, wherein the displaying comprises:

receiving a user input information comprising at least one of a condition for displaying the battery consumption state information on a display screen of the electronic device, location information of the battery consumption state information on the display screen, and an update period of the battery consumption state information; and displaying the battery consumption state information in response to the user input information.

8. The method of claim 1, further comprising:

transmitting the battery consumption state information to a service provider of a function or application of the electronic device, wherein the function or application is determined based on the battery consumption state information; and receiving, from the service provider, an adaptive control signal for the function or the application.

9. An electronic device for providing battery consumption information, the electronic device comprising:

a controller configured to obtain battery information changing according to a temperature and an aging state of a battery supplying a power to the electronic device, determine a minimum consumption voltage at a second time based on a consumption of a battery capacity and a battery voltage obtained by minimizing a power used in the electronic device at a first time preceding the second time; and determine a consumption rate of the battery capacity based on the battery information and the determined minimum consumption voltage; and a display unit configured to display the battery consumption state information comprising the determined consumption rate of the battery capacity on a display screen.

10. The electronic device of claim 9, wherein the battery information includes an internal resistance of the battery.

11. The electronic device of claim 10, wherein the controller is configured to calculate a lifetime of the battery calculated using a current of the electronic device and an available capacity of the battery, and wherein the current is obtained based on the battery voltage, the minimum consumption voltage, and the internal resistance.

12. The electronic device according to claim 11, wherein the display unit is configured to display the life time with the battery consumption state information.

13. The electronic device according to claim 9, wherein the controller is configured to update the minimum consumption voltage in a real time based on consumption estimates of the battery capacity estimated during a predetermined time interval;

a parameter calculator is configured to calculate an effective resistance of the battery using the updated minimum consumption voltage; and a rate estimator is configured to estimate the consumption rate of the battery in real time based on the effective resistance.

14. The electronic device according to claim 13, wherein the parameter calculator is configured to obtain a difference value by subtracting the updated minimum consumption voltage from the battery voltage and multiplying the difference by a sample time during consumption of a predetermined unit of charge in the battery, and calculate a result of the multiplying as the effective resistance.

15. The electronic device according to claim 9, wherein a transceiver is configured to receive a user input information comprising at least one of a condition for displaying the battery consumption state information on a display screen of the electronic device, location information of the battery consumption state information on the display screen, and an update period of the battery consumption state information has been received, and the controller is configured to control the display unit to display of the battery consumption state information in response to the user input information.

16. The electronic device of claim 9, further comprising:

a transceiver to transmit the battery consumption state information for a function or application of the electronic device, wherein the function or application is determined based on the battery and receive, from the service provider, an adaptive control signal for the function or the application.

* * * * *